(12) United States Patent
Khodabandehlou et al.

(10) Patent No.: US 8,090,894 B1
(45) Date of Patent: Jan. 3, 2012

(54) ARCHITECTURES FOR SUPPORTING COMMUNICATION AND ACCESS BETWEEN MULTIPLE HOST DEVICES AND ONE OR MORE COMMON FUNCTIONS

(75) Inventors: Hamid Khodabandehlou, Milpitas, CA (US); Syed Babar Raza, San Jose, CA (US); Anup Nayak, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 137 days.

(21) Appl. No.: 11/903,271

(22) Filed: Sep. 21, 2007

(51) Int. Cl.
*G06F 13/20* (2006.01)
*G06F 13/36* (2006.01)
*G06F 13/38* (2006.01)

(52) U.S. Cl. .................. 710/313; 710/314; 710/315

(58) Field of Classification Search .............. 710/313
See application file for complete search history.

(56) References Cited

U.S. PATENT DOCUMENTS

| | | | |
|---|---|---|---|
| 4,641,261 A | 2/1987 | Dwyer et al. |
| 4,701,913 A | 10/1987 | Nelson |
| 4,713,757 A | 12/1987 | Davidson et al. |
| 4,862,355 A | 8/1989 | Newman et al. |
| 4,866,606 A | 9/1989 | Kopetz |
| 4,890,222 A | 12/1989 | Kirk |
| 5,289,580 A | 2/1994 | Latif et al. |
| 5,388,249 A | 2/1995 | Hotta et al. |
| 5,392,421 A | 2/1995 | Lennartsson |
| 5,402,394 A | 3/1995 | Turski |
| 5,416,909 A | 5/1995 | Long et al. |
| 5,428,748 A | 6/1995 | Davidson et al. |
| 5,454,080 A | 9/1995 | Fasig et al. |
| 5,461,723 A | 10/1995 | Shah et al. |
| 5,488,657 A | 1/1996 | Lynn et al. |
| 5,497,067 A | 3/1996 | Shaw |
| 5,574,859 A | 11/1996 | Yeh |
| 5,577,213 A | 11/1996 | Avery et al. |
| 5,586,268 A | 12/1996 | Chen et al. |
| 5,598,409 A | 1/1997 | Madonna et al. |
| 5,606,672 A | 2/1997 | Wade |
| 5,615,344 A | 3/1997 | Corder |
| 5,621,902 A | 4/1997 | Cases et al. |
| 5,628,001 A | 5/1997 | Cepuran |
| 5,630,147 A | 5/1997 | Datta et al. |
| 5,634,074 A | 5/1997 | Devon et al. |

(Continued)

FOREIGN PATENT DOCUMENTS

EP 0890905 A2 1/1999

(Continued)

OTHER PUBLICATIONS

Axelson, Jan; "USB Complete"; Independent Publishers Group; Third Edition; 2005; various pages.*

(Continued)

*Primary Examiner* — Ryan Stiglic

(57) ABSTRACT

A controller circuit can provide communication paths between multiple host devices and at least one function interface (I/F), where a function I/F can allow access to a predetermined circuit function. The controller circuit can include an endpoint buffer circuit having a plurality of storage locations configurable as endpoints according to a predetermined data transmission protocol and a data switching circuit coupled to the endpoint point buffer circuit. The data switching circuit is configurable to provide communication paths that enable a first host I/F and a second host I/F to access at least a same function I/F, and enable the first and second host I/Fs to communicate with one another.

22 Claims, 11 Drawing Sheets

U.S. PATENT DOCUMENTS

| | | | |
|---|---|---|---|
| 5,642,489 A | 6/1997 | Bland et al. | |
| 5,655,148 A | 8/1997 | Richman et al. | |
| 5,671,355 A | 9/1997 | Collins | |
| 5,673,031 A | 9/1997 | Meier | |
| 5,675,813 A | 10/1997 | Holmdahl | |
| 5,687,346 A | 11/1997 | Shinohara | |
| 5,701,429 A | 12/1997 | Legvold et al. | |
| 5,748,911 A | 5/1998 | Maguire et al. | |
| 5,748,923 A | 5/1998 | Eitrich | |
| 5,754,799 A | 5/1998 | Hiles | |
| 5,758,188 A | 5/1998 | Appelbaum et al. | |
| 5,767,844 A | 6/1998 | Stoye | |
| 5,774,744 A | 6/1998 | Story et al. | |
| 5,778,218 A | 7/1998 | Gulick | |
| 5,781,028 A | 7/1998 | Decuir | |
| 5,793,745 A | 8/1998 | Manchester | |
| 5,794,033 A | 8/1998 | Aldebert et al. | |
| 5,802,328 A | 9/1998 | Yoshimura | |
| 5,802,558 A | 9/1998 | Pierce | |
| 5,805,834 A | 9/1998 | McKinley | |
| 5,828,854 A | 10/1998 | Wade | |
| 5,838,907 A | 11/1998 | Hansen | |
| 5,859,988 A | 1/1999 | Ajanovic et al. | |
| 5,862,362 A | 1/1999 | Somasegar et al. | |
| 5,898,861 A | 4/1999 | Emerson et al. | |
| 5,974,486 A | 10/1999 | Siddappa | |
| 5,982,879 A | 11/1999 | Lucey | |
| 6,009,480 A | 12/1999 | Pleso | |
| 6,012,103 A | 1/2000 | Sartore et al. | |
| 6,012,115 A | 1/2000 | Chambers et al. | |
| 6,038,667 A | 3/2000 | Helbig, Sr. | |
| 6,049,870 A | 4/2000 | Greaves | |
| 6,049,885 A | 4/2000 | Gibson et al. | |
| 6,067,628 A | 5/2000 | Krithivas et al. | |
| 6,085,325 A | 7/2000 | Jackson et al. | |
| 6,085,328 A | 7/2000 | Klein et al. | |
| 6,122,676 A | 9/2000 | Brief et al. | |
| 6,125,420 A | 9/2000 | Eidson | |
| 6,145,045 A | 11/2000 | Falik et al. | |
| 6,148,354 A | 11/2000 | Ban et al. | |
| 6,173,355 B1 | 1/2001 | Falik et al. | |
| 6,175,883 B1 | 1/2001 | Kvamme et al. | |
| 6,189,060 B1 | 2/2001 | Kodama | |
| 6,199,122 B1 | 3/2001 | Kobayashi | |
| 6,212,165 B1 | 4/2001 | Mann et al. | |
| 6,226,291 B1 | 5/2001 | Chauvel et al. | |
| 6,233,640 B1 | 5/2001 | Luke et al. | |
| 6,249,825 B1 | 6/2001 | Sartore et al. | |
| 6,272,644 B1 | 8/2001 | Urade et al. | |
| 6,275,499 B1 | 8/2001 | Wynn et al. | |
| 6,279,060 B1 | 8/2001 | Luke et al. | |
| 6,292,863 B1 | 9/2001 | Terasaki et al. | |
| 6,311,294 B1 | 10/2001 | Larky et al. | 714/44 |
| 6,366,980 B1 | 4/2002 | Haines et al. | |
| 6,389,495 B1 | 5/2002 | Larky et al. | |
| 6,415,343 B1 | 7/2002 | Fensore et al. | |
| 6,493,770 B1 | 12/2002 | Sartore et al. | |
| 6,505,267 B2 | 1/2003 | Luke et al. | 710/315 |
| 6,513,128 B1 | 1/2003 | Wang et al. | |
| 6,529,988 B1 | 3/2003 | Yoshikawa et al. | |
| 6,532,525 B1 | 3/2003 | Aleksic et al. | |
| 6,564,349 B1 | 5/2003 | Mitten et al. | |
| 6,601,118 B1 | 7/2003 | Rooney | |
| 6,615,306 B1 | 9/2003 | Ajanovic | |
| 6,618,788 B1 | 9/2003 | Jacobs | |
| 6,622,195 B2 * | 9/2003 | Osakada et al. | 710/316 |
| 6,622,251 B1 | 9/2003 | Lindskog et al. | |
| 6,625,687 B1 | 9/2003 | Halbert et al. | |
| 6,633,537 B1 | 10/2003 | Shimizu | |
| 6,633,933 B1 | 10/2003 | Smith et al. | |
| 6,633,944 B1 | 10/2003 | Holm et al. | |
| 6,678,761 B2 | 1/2004 | Garney et al. | |
| 6,684,272 B1 | 1/2004 | Leete et al. | |
| 6,697,906 B1 | 2/2004 | Ayukawa et al. | |
| 6,718,412 B2 | 4/2004 | Purcell et al. | |
| 6,760,852 B1 | 7/2004 | Gulick | |
| 6,816,929 B2 | 11/2004 | Ueda | |
| 6,816,976 B2 | 11/2004 | Wright et al. | |
| 6,934,793 B2 * | 8/2005 | Ying et al. | 710/316 |
| 6,970,419 B1 | 11/2005 | Kalkunte et al. | |
| 7,007,112 B2 | 2/2006 | Ishida et al. | |
| 7,010,638 B2 | 3/2006 | Deng et al. | |
| 7,054,980 B2 | 5/2006 | Wurzburg | |
| 7,062,618 B2 | 6/2006 | Tsunoda et al. | |
| 7,073,008 B2 | 7/2006 | Wu et al. | |
| 7,073,010 B2 | 7/2006 | Chen et al. | |
| 7,080,189 B1 | 7/2006 | Luttmann | 710/313 |
| 7,110,006 B2 | 9/2006 | MacInnis et al. | |
| 7,127,546 B2 * | 10/2006 | Ying et al. | 710/316 |
| 7,143,227 B2 | 11/2006 | Maine | |
| 7,162,565 B1 | 1/2007 | Kolokowsky et al. | 710/313 |
| 7,162,566 B2 * | 1/2007 | Lin | 710/314 |
| 7,187,946 B2 | 3/2007 | Palan | |
| 7,213,096 B2 | 5/2007 | Keys et al | |
| 7,231,485 B2 | 6/2007 | Harris et al. | 710/315 |
| 7,231,653 B2 | 6/2007 | Jutz | |
| 7,394,471 B2 | 7/2008 | Chan et al. | |
| 7,478,191 B2 | 1/2009 | Wurzburg et al. | |
| 7,484,031 B2 * | 1/2009 | Tjia | 710/313 |
| 7,644,147 B1 | 1/2010 | Wohlgemuth et al. | |
| 2002/0040444 A1 * | 4/2002 | Ohie et al. | 713/322 |
| 2002/0156949 A1 * | 10/2002 | Kubo et al. | 710/72 |
| 2003/0172223 A1 * | 9/2003 | Ying et al. | 710/316 |
| 2003/0185249 A1 | 10/2003 | Davies et al. | |
| 2003/0202510 A1 | 10/2003 | Witkowski et al. | |
| 2003/0212841 A1 * | 11/2003 | Lin | 710/62 |
| 2004/0030766 A1 | 2/2004 | Witkowski | |
| 2004/0181811 A1 | 9/2004 | Rakib | |
| 2005/0033880 A1 * | 2/2005 | Lin | 710/52 |
| 2005/0060490 A1 * | 3/2005 | Lu | 711/115 |
| 2005/0157711 A1 | 7/2005 | O'Dell et al. | |
| 2006/0036558 A1 | 2/2006 | Matthews | |
| 2006/0056401 A1 * | 3/2006 | Bohm et al. | 370/360 |
| 2006/0059289 A1 * | 3/2006 | Ng et al. | 710/305 |
| 2006/0059293 A1 * | 3/2006 | Wurzburg et al. | 710/313 |
| 2006/0253639 A1 * | 11/2006 | Lee et al. | 710/313 |
| 2007/0079045 A1 | 4/2007 | Luke | 710/313 |
| 2007/0170268 A1 | 7/2007 | Lee | |
| 2007/0186016 A1 | 8/2007 | Mennekens et al. | |
| 2007/0245057 A1 * | 10/2007 | Bohm et al. | 710/313 |
| 2007/0245058 A1 * | 10/2007 | Wurzburg et al. | 710/313 |
| 2007/0245059 A1 * | 10/2007 | Tjia | 710/313 |
| 2008/0307145 A1 | 12/2008 | Goren et al. | |
| 2009/0013103 A1 * | 1/2009 | Chang et al. | 710/36 |
| 2009/0055569 A1 * | 2/2009 | Maheshwari et al. | 710/311 |

FOREIGN PATENT DOCUMENTS

| | | | |
|---|---|---|---|
| EP | 0987876 A2 | | 3/2000 |
| EP | 1111498 A2 | | 6/2001 |
| GB | 2352540 A | * | 1/2001 |
| JP | 404200119 A | | 7/1992 |
| JP | 410097303 A | | 4/1998 |
| JP | 410097309 A | | 4/1998 |

OTHER PUBLICATIONS

Axelson, Jan; "USB Complete"; Independent Publishers Group; Third Edition; 2005; pp. i-xiv.*

Philips Semiconductors; "PDIUSBBD11 USB device with serial interface"; Philips Semiconductors; Jul. 22, 1999; all pages.*

Compaq Computer Corporation et al., *Universal Serial Bus Specification—Rev 2.0*, Apr. 27, 2000, pp. ii, 18-19, 33-34, 120, 145, 196-207, 227-228.

Cypress Semiconductor Corporation, *MoBL-USBTM FX2LP18 USB Microcontroller*, 2007.

"USB 2.0 mux interfaces USB, non-USB devices", *EE Times Asia*, May 15, 2007, found on the Internet at http:/www.eetasia.com/ART_8800464295_590626_NP_870689ba.HTM?1000013030 &8800464295&click_from=1000013030,8619953561,20 07-05-15.EEOL.EENEWS.

Intersil Americas Inc., *ISL54200 Data Sheet FN6408.0*, Jan. 24, 2007.

Cypress Semiconductor Corporation, "West Bridge: Antioch USB/Mass Storage Peripheral Controller," Revised Mar. 2007, Revision C, CYWB0124AB, pp. 1-20; 20 pages.

USPTO Notice of Allowance for U.S. Appl. No. 11/240,908, dated Sep. 14, 2009; 4 pages.
USPTO Notice of Allowance for U.S. Appl. No. 11/240,908, dated Jun. 11, 2009; 4 pages.
USPTO Final Rejection for U.S. Appl. No. 11/240,908, dated 11/14/2008; 11 pages.
USPTO Non-Final Rejection for U.S. Appl. No. 11/240,908, dated Apr. 8, 2008; 11 pages.
USPTO Final Rejection for U.S. Appl. No. 11/240,908, dated Nov. 14, 2007; 10 pages.
USPTO Non-Final Rejection for U.S. Appl. No. 11/240,908, dated Mar. 28, 2007; 6 pages.
International Search Report for International Application No. PCT/US06/33412 mailed Sep. 14, 2007; 1 page.
Written Opinion of the International Searching Authority for International Application No. PCT/US06/33412 mailed Sep. 14, 2007; 4 pages.
USPTO Notice of Allowance for U.S. Appl. No. 10/160,442, dated Mar. 2, 2006; 7 pages.
USPTO Final Rejection for U.S. Appl. No. 10/160,442, dated Dec. 23, 2005; 10 pages.
USPTO Non-Final Rejection for U.S. Appl. No. 10/160,442, dated Oct. 17, 2005; 8 pages.
USPTO Non-Final Rejection for U.S. Appl. No. 10/160,442, dated Jul. 22, 2005; 7 pages.
USPTO Advisory Action for U.S. Appl. No. 10/160,442, dated Apr. 22, 2005; 3 pages.
USPTO Final Rejection for U.S. Appl. No. 10/160,442, dated Feb. 9, 2005; 8 pages.
USPTO Non-Final Rejection for U.S. Appl. No. 10/160,442, dated Aug. 25, 2004; 7 pages.
USPTO Notice of Allowance for U.S. Appl. No. 10/796,872, dated Sep. 6, 2006; 6 pages.
"Universal Serial Bus Mass Storage Class Specification Overview Revision 1.2," USB Implementers Forum, Jun. 23, 2003, pp. 1-7; 7 pages.
"Universal Serial Bus Mass Storage Class Bulk-Only Transport Revision 1.0," USB Implementers Forum, Sep. 31, 1999, pp. 1-22; 22 pages.
"Universal Serial Bus Mass Storage Class Control/Bulk/Interrupt Revision 1.0," USB Implementers Forum, Dec. 14, 1998, pp. 1-26; 26 pages.
"CY4611—FX2 USB to ATA/CF Reference Design Notes," Cypress Semiconductor Corporation, Nov. 2000-Jul. 2002, pp. 1-7; 7 pages.
"EZ-USB FX2 USB Microcontroller High-Speed USB Peripheral Controller," CY7C68013, Cypress Semiconductor Corporation, Jun. 21, 2002, pp. 1-50; 50 pages.
PC Guide.com, "Advanced Technology Attachment ATA-2," Jan. 2003, pp. 1-14; 14 pages.
Webopedia.com, "ATA Short for Advanced Technology Attachment," [Viewed Jan. 2003, Retrieved Mar. 25, 2010]; 1 page.
Tom Pratt, "Serial ATA Interface on Client Systems," Dell Computer Corporation, Jun. 2003, pp. 1-4; 4 pages.
"CY7C68300A Revision *B," Cypress Semiconductor Corporation, pp. 4 and 11; 2 pages.
"EZ-USB FX2 Technical Reference Manual Version 2.1," Cypress Semiconductor Corporation, Copyright 2000 and 2001, pp. 1-130; 130 pages.
USPTO Notice of Allowance for U.S. Appl. No. 09/990,739, dated Mar. 26, 2007; 2 pages.
USPTO Notice of Allowance for U.S. Appl. No. 09/990,739, dated Feb. 7, 2007; 4 pages.
USPTO Final Rejection for U.S. Appl. No. 09/990,739, dated Dec. 6, 2006; 12 pages.
USPTO Non-Final Rejection for U.S. Appl. No. 09/990,739, dated Jul. 24, 2006; 17 pages.
USPTO Miscellaneous Action for U.S. Appl. No. 09/990,739, dated Jun. 7, 2005; 4 pages.
USPTO Advisory Action for U.S. Appl. No. 09/990,739, dated Feb. 2, 2005; 3 pages.
USPTO Final Rejection for U.S. Appl. No. 09/990,739, dated Oct. 28, 2004; 9 pages.
USPTO Non-Final Rejection for U.S. Appl. No. 09/990,739, dated Apr. 7, 2004; 9 pages.
NEC, "NEC USB2.0-ATA/ATAPI Bridge," NEC Press Release, Oct. 5, 2000, Retrieved from <http://www.nec.co.jp/press/en/0010/0501.html> on Mar. 25, 2010; 2 pages.
Inoue et al., "NAND Flash Applications Design Guide," Revision 1.0, Toshiba America Electronic Components Inc., Apr. 2003, pp. 1-29; 15 pages.
Whatis.com, Definition of "state machine," [Updated May 18, 2004, Retrieved Mar. 25, 2010]; 1 page.
Craig Peacock, "USB in a Nutshell," <http://www.beyondlogic.org/usbnutshell/usb-in-a-nutshell.pdf>, Third Release, Nov. 2002, pp. 1-30; 30 pages.
"Designing a Robust USB Serial Interface Engine (SIE)," <http://www.usb.org/developers/whitepapers/siewp.pdf>, [Oct. 2003, Retrieved from the Internet on Mar. 25, 2010], pp. 1-9; 9 pages.
USPTO Notice of Allowance for U.S. Appl. No. 09/176,047, dated Jun. 26, 2001; 4 pages.
USPTO Non-Final Rejection for U.S. Appl. No. 09/176,047, dated Feb. 28, 2001; 7 pages.
U.S. Appl. No. 12/228,787: "Bridge Device with Page-Access Based Processor Interface," Maheshwari et al., filed on Aug. 14, 2008; 54 pages.
International Written Opinion of International Searching Authority, dated Nov. 19, 2008 for International Application No. PCT/US08/09798; 5 pages.
International Search Report of International Searching Authority, dated Nov. 19, 2008 for International Application No. PCT/US08/09798; 4 pages.
Intel USB Mobile System Design Guidelines, Revision 1.0, Nov. 6, 1996, pp. 1-19; 22 pages.
Intel USB Voltage Drop and Droop Measurement, Nov. 18, 1996, pp. 1-19; 19 pages.
Universal Serial Bus Specification, Revision 1.0, Jan. 15, 1996, pp. 1-268; 268 pages.
Kosar A. Jaff, "Universal Serial Bus and the Multimedia PC," 1996, Intel Corporation, pp. 1-9; 9 pages.
Micron Technology Inc., NAND Flash Memory Data Sheet MT29F4G08AAA, MT29F8G08BAA, MT29F8GO8DAA, MT29F16G08FAA, 2006, pp. 3-81; 40 pages.
Cypress Semiconductor Corporation, West Bridge Astoria Data Sheet CYWB0224ABS/CYWB0224ABM (Advanced Information), Revision A, Dec. 7, 2007, pp. 1-6; 6 pages.
USPTO Non-Final Rejection for U.S. Appl. No. 11/906,033, dated Oct. 29, 2009; 8 pages.
USPTO Non-Final Rejection for U.S. Appl. No. 11/904,758, dated Mar. 17, 2010; 9 pages.
USPTO Advisory Action for U.S. Appl. No. 11/904,758, dated Jan. 7, 2010; 3 pages.
USPTO Final Rejection for U.S. Appl. No. 11/904,758, dated Oct. 29, 2009; 8 pages.
USPTO Non-Final Rejection for U.S. Appl. No. 11/904,758, dated Apr. 1, 2009; 6 pages.
USPTO Notice of Allowance for U.S. Appl. No. 09/821,006, dated Aug. 19, 2004; 8 pages.
USPTO Non-Final Rejection for U.S. Appl. No. 09/821,006, dated Mar. 10, 2004; 11 pages.
USPTO Notice of Allowance for U.S. Appl. No. 09/232,578, dated Aug. 24, 2001; 3 pages.
USPTO Non-Final Rejection for U.S. Appl. No. 09/232,578, dated Mar. 13, 2001; 7 pages.
Universal Serial Bus Specification, Revision 1.1, Sep. 23, 1998, pp. 1-311; 327 pages.
USPTO Notice of Allowance for U.S. Appl. No. 08/886,923, dated Aug. 30, 1999; 9 pages.
USPTO Non-Final Rejection for U.S. Appl. No. 08/886,923, dated Feb. 16, 1999; 6 pages.
USPTO Notice of Allowance for U.S. Appl. No. 09/476,923, dated Feb. 5, 2001; 3 pages.
USPTO Non-Final Rejection for U.S. Appl. No. 09/476,923, dated Aug. 29, 2000; 11 pages.
USPTO Notice of Allowance for U.S. Appl. No. 09/878,488, dated Jul. 26, 2002; 4 pages.

USPTO Non-Final Rejection for U.S. Appl. No. 09/878,488, dated Feb. 8, 2002; 7 pages.
USPTO Notice of Allowance for U.S. Appl. No. 09/812,475, dated Aug. 13, 2002; 7 pages.
USPTO Final Rejection for U.S. Appl. No. 09/812,475, dated May 8, 2002; 7 pages.
USPTO Non-Final Rejection for U.S. Appl. No. 09/812,475 , dated Oct. 10, 2001; 4 pages.
Lucent Technologies, "USS-720 INSTANT USB USB-to_IEEE 1284 Bridge," Advanced Data Sheet, Rev. 5, Nov. 1997, pp. 1-27; 28 pages.
"Lucent Technology Delivers INSTANT USB for Peripherals," Press Release, Jan. 1997; 3 pages.
USPTO Notice of Allowance for U.S. Appl. No. 09/273,310, dated Dec. 18, 2000; 3 pages.
USPTO Non-Final Rejection for U.S. Appl. No. 11/906,033, dated May 28, 2010; 8 pages.
USPTO Notice of Allowance for U.S. Appl. No. 09/671,554, dated Apr. 16, 2003; 7 pages.
USPTO Notice of Allowance for U.S. Appl. No. 09/205,558, dated Mar. 23, 2001; 3 pages.
USPTO Non-Final Rejection for U.S. Appl. No. 09/205,558, dated Oct. 18, 2000; 6 pages.
"Universal Serial Bus Mass Storage Class Specification Overview," Revision 1.1, Jun. 28, 2000; pp. 1-7; 7 pages.
Fairchild Semiconductor Corporation, Fairchild P/N "74AC00-Quad 2-Input NAND Gate," Nov. 1999, pp. 1-2; 2 pages.
Fairchild Semiconductor Corporation, Fairchild P/N "74AC04-Hex Inverter," Nov. 1999, pp. 1-2; 2 pages.
USPTO Non-Final Rejection for U.S. Appl. No. 12/228,787, dated Jul. 23, 2010; 31 pages.
USPTO Notice of Allowance for U.S. Appl. No. 11/904,758, dated Sep. 8, 2010; 4 pages.
USPTO Final Rejection for U.S. Appl. No. 11/906,033, dated Dec. 22, 2010; 7 pages.
USPTO Notice of Allowance for U.S. Appl. No. 12/228,787, dated Feb. 18, 2011; 5 pages.
USPTO Advisory Action for U.S. Appl. No. 11/906,033, dated Mar. 7, 2011; 1 page.
USPTO Notice of Allowance for U.S. Appl. No. 12/228,787, dated May 26, 2011; 8 pages.

* cited by examiner

ARCHITECTURES FOR SUPPORTING COMMUNICATION AND ACCESS BETWEEN MULTIPLE HOST DEVICES AND ONE OR MORE COMMON FUNCTIONS

TECHNICAL FIELD

The present invention relates generally to architectures that provide communication paths between host devices and functions, and more particularly to architectures for accommodating communication paths between multiple hosts and one or more shared functions.

BACKGROUND OF THE INVENTION

Communication protocols can allow a "host" computing devices (for example a personal computer, laptop computer, etc.) to communicate with one or more "secondary" devices. For example, media files can be transferred between media players and a host, image files can be transferred from a camera to a host, or input devices can provide input data for the host (e.g., mouse, game controller, etc.). One popular communication protocol is that included in the Universal Serial Bus (USB) Specification.

To better understand various aspects of the disclosed embodiments, conventional systems for interconnecting secondary devices with a host will now be described with reference to FIGS. 12A to 12C.

FIG. 12A shows a first conventional USB system, designated by the general reference character 1200. Conventional system 1200 can include a USB host device 1202, a USB controller 1204 and a circuit that executes a predetermined function 1206. USB host device 1202 communicates with USB controller 1204 via a USB connection 1208. USB controller 1204 can access function 1206 in response to requests from USB host device 1202. In such an arrangement, only the USB host device 1202 accesses the given function 1206. That is, the function 1206 is not common to more than one host device.

FIG. 12B shows a second conventional USB system, this one designated by the reference character 1220. Conventional system 1220 includes a USB host device 1222 connected to a USB controller 1224, via a USB connection 1228, in a similar fashion to that of FIG. 12A. However, in FIG. 12B a second host device 1223 is connected to USB controller 1224 via an interface 1225. In such an arrangement, USB 1222 host and second host 1223 can communicate with one another. However, the two host devices do not share a common function.

FIG. 12C shows a third conventional USB system, this one designated by the reference character 1230. Conventional system 1230 includes the same arrangement as FIG. 12B, but includes function 1236 accessed by second host 1233. In such an arrangement, second host 1233 can have direct access to function 1236. USB host 1232 can access function 1236, but such access must be by way of the second host 1233. As a result, the second host 1233 typically requires additional software, and if necessary, computing power, as requests to access function 1236 by first host 1232 must first be processed by second host 1233.

DETAILED DESCRIPTION

Figure 12A:
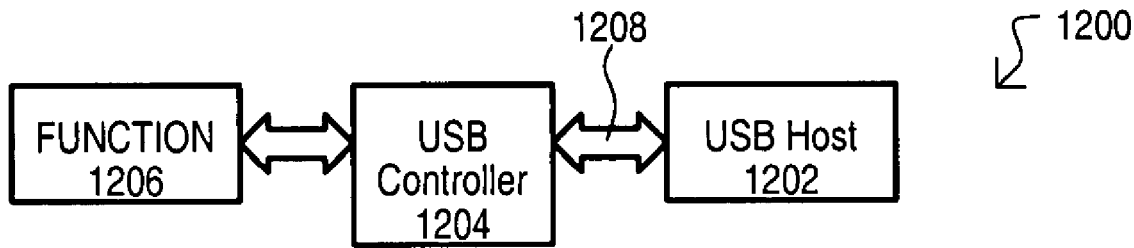
FIGS. 12A to 12C show examples of conventional Universal Serial Bus (USB) systems.
Figure 12B:
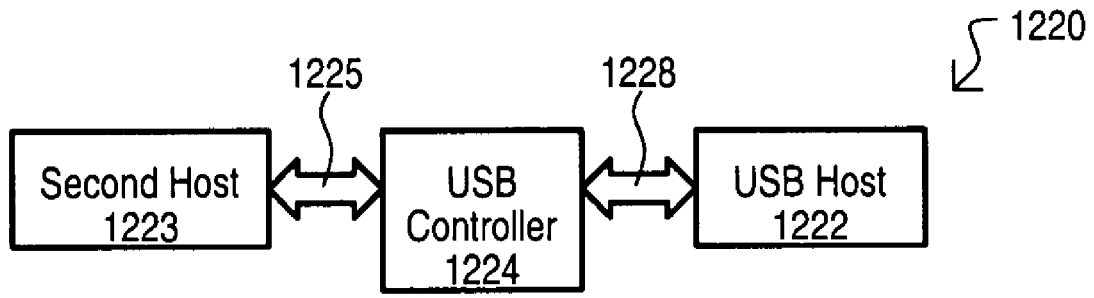
Figure 12C:
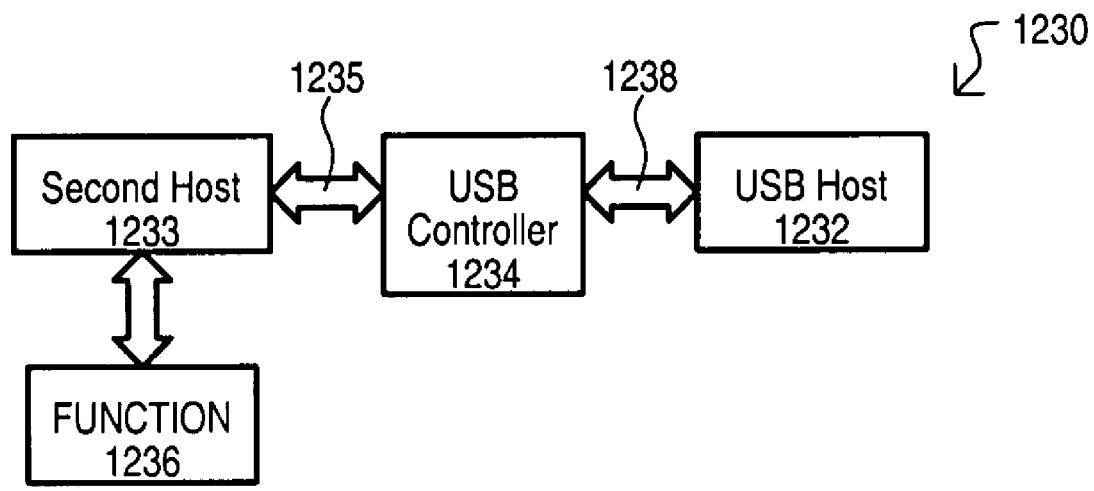

Various embodiments will now be described in detail that show methods and devices that can allow for communication paths to be created between two hosts, as well as between the hosts and a common function. Such communication paths can be essentially independently of one another. As a result, accesses to a function by either host can be "direct" (i.e., not pass through the other host). Further, such an arrangement can allow hosts to access multiple functions, and/or allow multiple logical communication endpoints to be created from a single physical communication endpoint. Such arrangements can provide significant communication speeds over conventional arrangements like that shown in FIGS. 12A to 12C, without additional software or hardware, as in the case of FIG. 12C.

Figure 1:
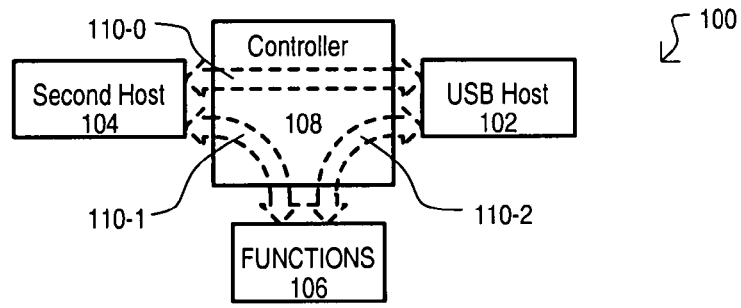
FIG. 1 shows a block diagram of a system according to one embodiment of the invention.

Referring now to FIG. 1, a system according to a first embodiment is shown in a block diagram and designated by the reference character 100. A system 100 can include a first host device 102, a second host device 104, a functions circuit 106, and a controller circuit 108. A first host device 102 can send commands, data and receive responses and data according to a predetermined protocol. In the very particular example shown, a first host device 102 can be a Universal Serial Bus (USB) type host.

A second host device 104 can also send commands and data, and receive responses and data. While a second host device 104 could be a USB type host, a second host device 104 can also operate according to a different protocol than first host device 102, and/or can have an entirely different interface than first host device 102. As but two very particular examples, if first host device 102 communicates via a serial interface (e.g., USB), second host device 104 can communicate via a parallel interface or different type of serial interface.

Functions circuit 106 can provide one or more predetermined function. However, unlike a conventional case like that of FIG. 12C, one or more functions executable by functions circuit 106 can be accessed by either first host device 102 or second host device 104 directly, and not via the other host device. In very particular embodiments, a functions circuit 106 can provide a storage function and/or an input/output (I/O) function. A storage function can be a function that receives data for storage on a storage media. As but one example, a storage function can store media files, even more particularly, store media files on a solid state nonvolatile media, such as "flash" EEPROM memory. An I/O function can allow a host device to send data to, and receive data from another device or circuit, in order to execute a predetermined operation. As but a few examples, an I/O function can be a modem, input device, graphical display, cell phone, computer, personal digital assistant (PDA), etc.

A controller circuit 108 can provide configurable communication paths between first host device 102, second host device 104 and functions circuit 106. Such communication paths are shown as 110-0, 110-1 and 110-2. Communication path 110-0 can be a first host-to-second host (H1-H2) path formed between first host 102 and second host device 104 that does not access functions circuit 106. Communication path 110-1 can be a second host-to-function (H2-F) path formed between second host 104 and functions circuit 106 that does not access first host device 102. In a similar fashion, communication path 110-2 can be a first host-to-function (H1-F) path formed between first host device 102 and functions circuit 106 that does not access second host device 104.

In this way, a controller circuit 108 can provide direct communication paths between host devices and between the host devices and one or more common functions. Such direct communication paths (e.g., paths not through other devices or functions) can allow for faster and/or more efficient data throughput or function execution. Further, such an arrangement can allow for greater versatility in a secondary device, as multiple functions can be accessed any of multiple host devices.

Figures 2A, 2B:
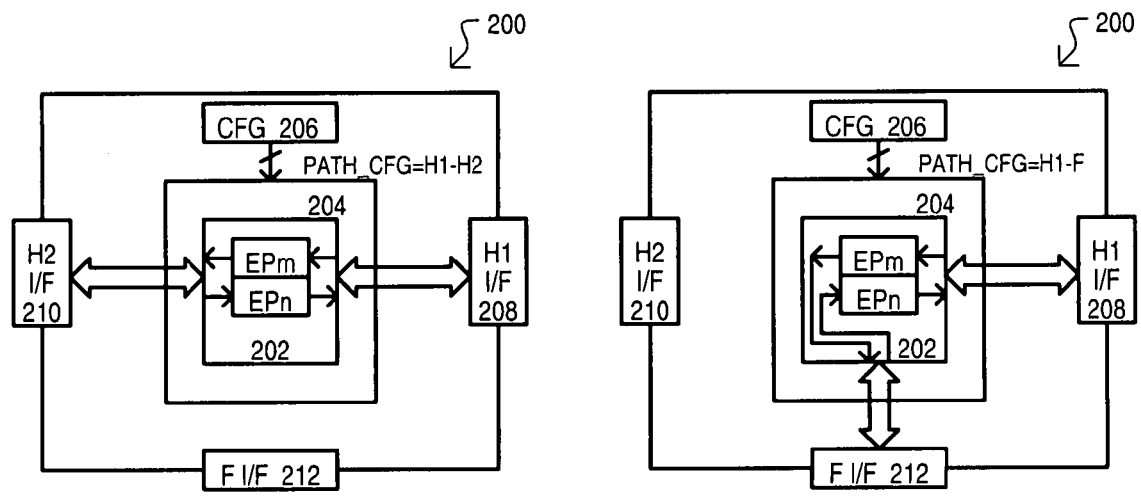
FIGS. 2A to 2C show a controller device and associated configurations according to an embodiment of the invention.
Figure 2C:
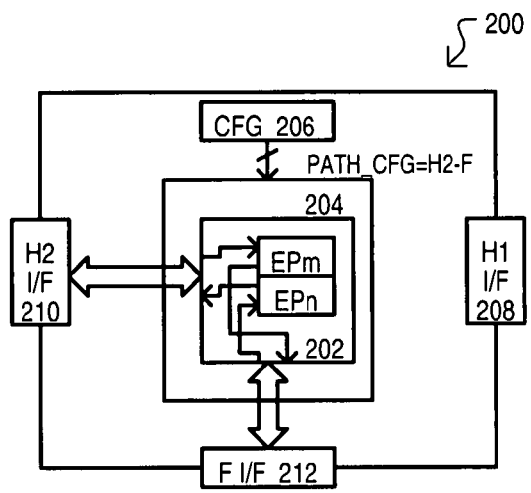

Referring now to FIGS. 2A to 2C a controller circuit according to another embodiment is shown in a block schematic diagram, and designated by the general reference character 200. In one very particular arrangement, controller circuit 200 can correspond to that shown as 108 in FIG. 1.

A controller circuit 200 can include an endpoint (EP) storage circuit 202, a switch/control circuit 204, configuration circuit 206, a first host interface (I/F) 208, a second host I/F 210, and a function I/F 212. An EP storage circuit 202 can include storage locations divided, or dividable into multiple EP locations. Each such EP location can store a quantifiable amount of data (e.g., data of a given packet length, or payload size). Such EP locations can also be assigned an identification value (e.g., EP number), and configured for a particular direction. In the example of FIGS. 2A to 2C, EP location directions are made with respect to a host I/F 208. Thus, data received from a direction from first host I/F 208 can be considered an "OUT" direction. Data being sent toward first host I/F 208 can be considered an "IN" direction. Further, and as will be described in more detail below, a size of each EP location can also be configurable.

It is noted that an endpoint can be a destination or source of information commonly identifiable by all entities participating in a communication flow (e.g., device, threads, etc.). In the very particular example of the Universal Serial Bus (USB) protocol, an endpoint can be a uniquely addressable portion of a USB device that is the source or sink of information in a communication flow between a host and a function. Each USB endpoint can have an endpoint number as well as a direction of flow.

In very particular arrangements, the physical implementation of an endpoint can include an endpoint buffer. An endpoint buffer can be a memory circuit that stores data arriving from a host (configured in the OUT direction), or that stores data that can be read out to a host (configured in the IN direction). Thus, a physical endpoint can be circuitry that can actually stores data in a communication flow. In particular embodiments, such data can be in a predetermined packet format. According to particular embodiments of the invention, an endpoint buffer can be a first-in-first-out memory (FIFO), with start and end pointers that can dictate where data can be read from or written to. Such endpoint FIFOs can include flags to indicate when the FIFO is ready to be read from or written to.

A physical endpoint is a buffer where data will be stored. Logical endpoints are USB endpoints that can be mapped to any physical endpoint. Physical endpoint can be dedicated to a logical endpoint or shared between multiple logical endpoints. All logical endpoints that map to a single physical endpoint share the buffer(s).

Referring still to FIG. 2, a switch/control circuit 204 can provide data paths between the various I/Fs (208, 210 and 212) and EP storage location 202. Such data paths can be configurable according to configuration data PATH_CFG provided from configuration circuit 206. FIGS. 2A to 2C show various different data path configurations.

FIG. 2A shows an example of a H1-H2 communication path configuration. In such an arrangement, configuration circuit 206 can provide a communication path between first host I/F 208 and second host I/F 210. More particularly, within EP storage locations 202, one EP (EPm) can have an OUT configuration while another EP (EPn) can have an IN configuration. Within switch/control circuit 204, a data path can exist between EPn and EPm and first host I/F 208 and second host I/F 210. Thus, communications from first host I/F 208 to second host I/F 210 can pass through EP storage locations 202, more particularly EPm. Similarly, communications from second host I/F 210 to first host I/F 208 can also pass through EP storage locations 202, more particularly EPn. It is understood that in the example of FIGS. 2A to 2C, while EPm and EPn can be different numbered endpoints, such endpoints could have the same endpoint number, but be fixed in a particular direction.

In this way, a communication path between two hosts can be created that includes endpoint locations.

FIG. 2B shows an example of a H1-F communication path configuration. In such an arrangement, configuration circuit 206 can provide a communication path between first host I/F 208 and function I/F 212. Such an arrangement can allow a host device to access one or more functions available at function I/F 212 essentially directly (e.g., without having to pass through second host I/F 210). More particularly, within EP storage locations 202, one EP (EPm) can have an OUT configuration while another EP (EPn) can have an IN configuration. Within switch/control circuit 204, a data path can exist between EPn and EPm and first host I/F 208 and function I/F 212. Thus, communications from first host I/F 208 to function I/F 212 can pass through EP storage locations 202, more particularly EPm. Similarly, communications from function I/F 212 to first host I/F 208 can also pass through EP storage locations 202, more particularly EPn.

In this way, a communication path between one host and one or more functions can be created that includes endpoint locations.

FIG. 2C shows an example of a H2-F communication path configuration. In such an arrangement, configuration circuit 206 can provide a communication path between second host I/F 210 and function I/F 212. Such an arrangement can allow a host device to access one or more functions available at function I/F 212 essentially directly (e.g., without having to pass through first host I/F 208). More particularly, within EP storage locations 202, one EP (EPm) can exist. Within switch/control circuit 204, a data path can exist between EPm and second host I/F 208 and function I/F 212. Thus, communications between second host I/F 210 and function I/F 212 can pass through EP storage locations 202, more particularly EPm. In one particular arrangement, and as will be described in other examples herein, in an H2-F configuration, data transfers can include switching the direction of the target endpoint. More particularly, an endpoint can have an IN direction when data is sent from either the second host I/F 210 or function I/F 212, and then can be switched to an OUT configuration to enable data to be received by the function I/F 212 or second host I/F 210.

In this way, a communication path between a second of multiple hosts and one or more functions can be created that includes endpoint locations.

Figure 3:
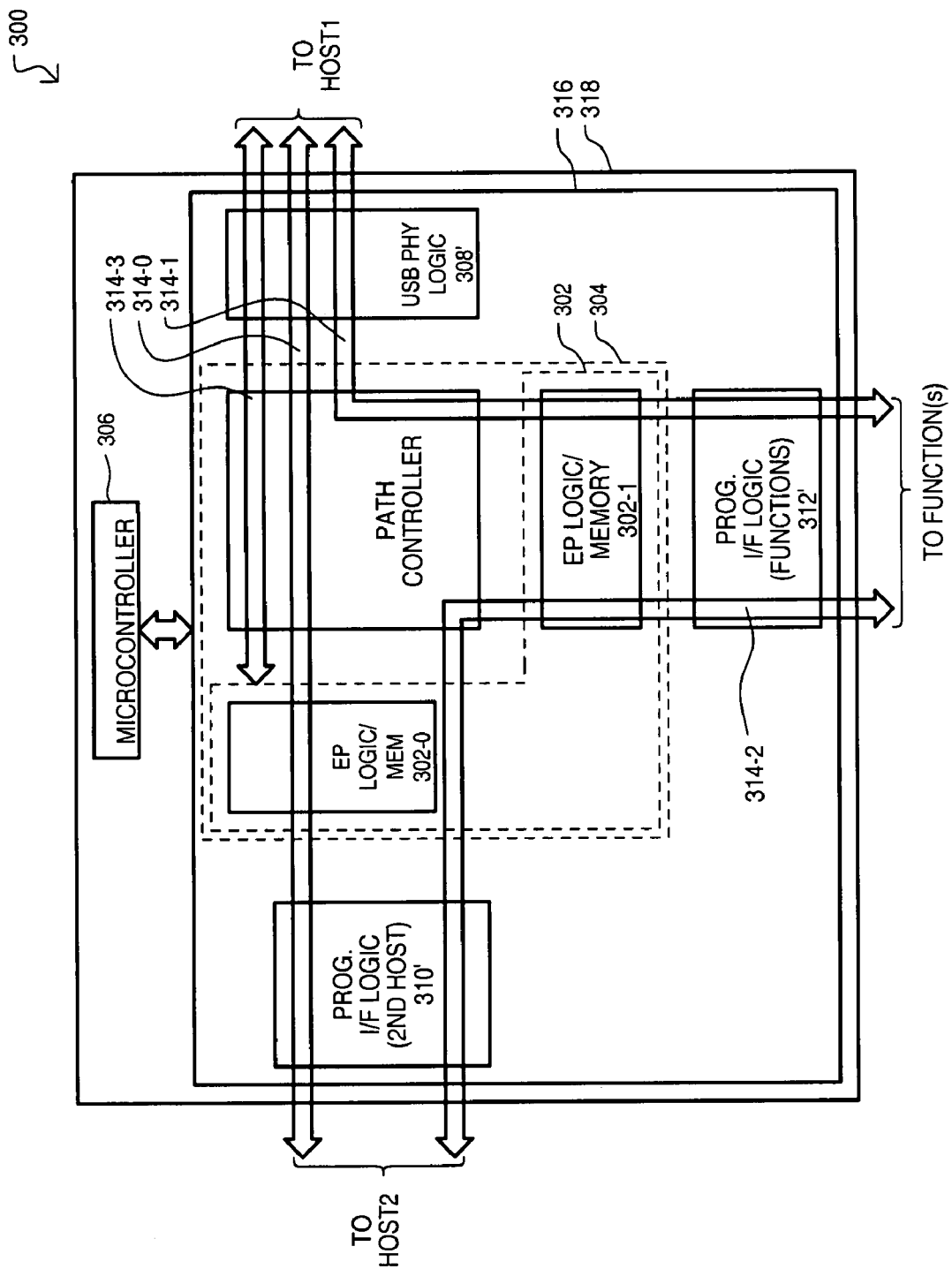
FIG. 3 shows a controller device according to another embodiment of the invention.

Referring now to FIG. 3, a controller circuit according to another embodiment is shown in a block schematic diagram, and designated by the general reference character 300. In two very particular arrangements, controller circuit 300 can correspond to that shown as 108 in FIG. 1 and/or that shown as 200 in FIGS. 2A to 2C.

In the particular example of FIG. 3, a controller circuit 300 can include some sections like those of FIGS. 2A to 2C, thus like sections are referred to by the same reference character but with the first digit being a "3" instead of a "2". FIG. 3 can differ from FIGS. 2A to 2C in that EP storage circuit 302 is shown to be logically divided into EP logic memories 302-0 and 302-1. Such a division can represent how some endpoints can be dedicated for particular communication paths. More particularly, EP logic memory 302-0 can include EPs designated for transfer of data between first host I/F 308' and second host I/F 310'. EP logic memory 302-1 can include EPs designated for transfer of data between function I/F 312' and either of first host I/F 308' and second host I/F 310'.

Switch controller circuit 304 can provide control signals to EP storage circuit 302 to enable switch paths and create various communication paths shown as 314-0 to 314-3 in FIG. 3.

In the example of FIG. 3, a configuration circuit 306 can include a processor circuit that can have a processor and associated instruction memory and input/outputs. Configuration circuit 306 can provide configuration signals to path region 316, which can include the interfaces, memory and logic for enabling the various communication paths between I/Fs (308', 310' and 312'). More particularly, a processor equipped configuration circuit 306 can allow configuration data to set up such paths dynamically, via software or firmware for execution by the processor. In one very particular example, a configuration circuit can include an embedded (included in the same substrate as path region 316) 8051 microcontroller, or equivalent. However, alternate embodiments can include different types of microcontrollers or processors to provide the advantageous changing of switch paths based on one or more sets of instructions.

FIG. 3 further differs from FIGS. 2A to 2C in that a first host I/F 308' can particularly include USB physical layer logic, second host I/F 310' and function I/F 312' can both be programmable. Thus, first host I/F 308' can include logic for receiving packet data according to the USB protocol.

Second host I/F 310' can be programmable to accommodate different types of host interfaces. For example, second host I/F 310' can be programmable to enable input signals generated by a second host to be capable of accessing endpoint locations and/or provide control data to other portions of controller circuit 300. Similarly, signals generated by controller circuit 310' can be altered for compatibility with such a second host device.

Function I/F 312' can be programmable to provide access to different types and/or numbers of functions. For example, function I/F 312' can be programmable to enable any of multiple function interfaces. Further I/F 312' can be programmable to provide different versions of a same function (e.g., one function may execute predetermined operations and provide/receive data according to a first bit width, while a different version of the same function can perform the same operation, but provide/receive data according to a larger or smaller bit width).

As noted above, communication paths that can be created with controller circuit are shown as 314-0 to 314-3. Communication path 314-0 can be a H1-H2 communication path passing from first host I/F 308' to second host I/F 310', but completely bypasses function I/F 312'. Communication path 314-1 can be a H1-F communication path passing from first host I/F 308' to function I/F 312', bypassing second host I/F 310'. Communication path 314-2 can be a H2-F communication path passing from second host I/F 310' to function I/F 312', bypassing first host I/F 308'. FIG. 3 also shows a first host-to-control (H1-C) communication path 314-3. Such a communication path 310 can enable a first host to provide control data to controller circuit 300.

Referring still to FIG. 3, a controller circuit 300 is preferably a single integrated circuit formed within a common substrate area 318. Such an arrangement can provide a compact way of interconnecting various different devices.

Figure 4:
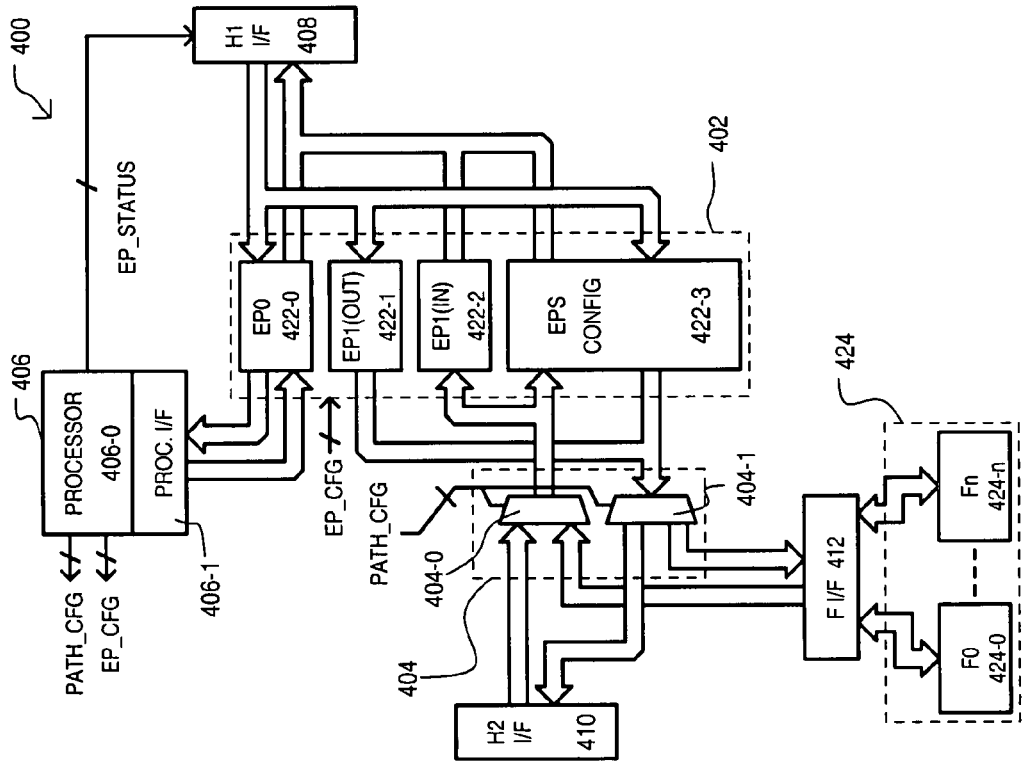
FIG. 4 shows a controller device according to yet another embodiment of the invention.

Referring now to FIG. 4, a controller circuit according to another embodiment is shown in a block schematic diagram, and designated by the general reference character 400. In very particular arrangements, controller circuit 400 can correspond to those shown as 108 in FIG. 1, in FIGS. 2A to 2C, or that shown in FIG. 3.

A controller circuit 400 can include some sections like those of FIGS. 2A to 2C, thus like sections are referred to by the same reference character but with the first digit being a "4" instead of a "2".

FIG. 4 can differ from FIGS. 2A to 2C in that EP storage circuit 402 includes three set endpoints, as well as a configurable endpoint space. The set endpoints can include an EP0 422-0, configured in both an IN and OUT direction, EP1 422-1 configured in an OUT direction, and EP1 422-2 configured in an IN direction. Configurable EP space 422-3 can be configured into one or more endpoints, with varying characteristics. As but a few examples, such characteristics can include buffer size, direction (e.g., IN or OUT), or manner of storing data (e.g., single, double or quad buffering). The various EPs can provide indications when data blocks of certain sizes have been written into the buffer and/or read from the buffer. Thus, EPs can generate indications when an entire packet of data has been received or read, to thereby indicate the EP is available for more data.

In the particular example of FIG. 4, switch/control circuit 404 can be conceptualized as including a multiplexer (MUX) path 404-0 and a de-MUX path 404-1 that can be controlled according to path configuration data PATH_CFG. Such an arrangement can allow for dynamic switching of data paths between EP storage circuit 402 and either of second host I/F 410 or function I/F 412.

A configuration circuit 406 can include a processor block 406-0 and processor I/F 406-1. A processor block 406-0 can include a processor, associated I/Os, and instruction set. Although not shown in FIG. 4, a configuration circuit 406 can also share a data bus with either second host I/F 410, function I/F 412, or both. Configuration circuit 406 can provide configuration signals for placing controller circuit 400 into various configurations. In the example shown, configuration circuit 406 can provide path configuration data PATH_CFG for controlling switch/control circuit 404 as well as endpoint configuration data EP_CFG for configuring EP space 422-3. Configuration circuit 406 can receive indications from the various EPs that indicate the status of the EPs. Such status information EP_STATUS can be provided to first host I/F 408. Such an arrangement can allow access to an EP via first host I/F 408 to be temporarily halted in the event the EP is being accessed via the second host I/F 410 or via function I/F 412.

The particular example of FIG. 4 also shows a function section 424 connected to function I/F 412. It is understood that while function section 424 can be embedded into a same substrate as controller circuit 400, preferably such a function section can reside on one or more other integrated circuit devices. Function section 424 can include multiple function circuits, shown as 424-0 to 424-n. Function I/F 412 can allow access to any such functions (424-0 to 424-n) via both first host I/F 408 as well as second host I/F 410.

Having described the structure of a controller circuit in FIG. 4, various operations of such a controller circuit will now be described with reference to FIGS. 5A to 5F.

Figure 5A:
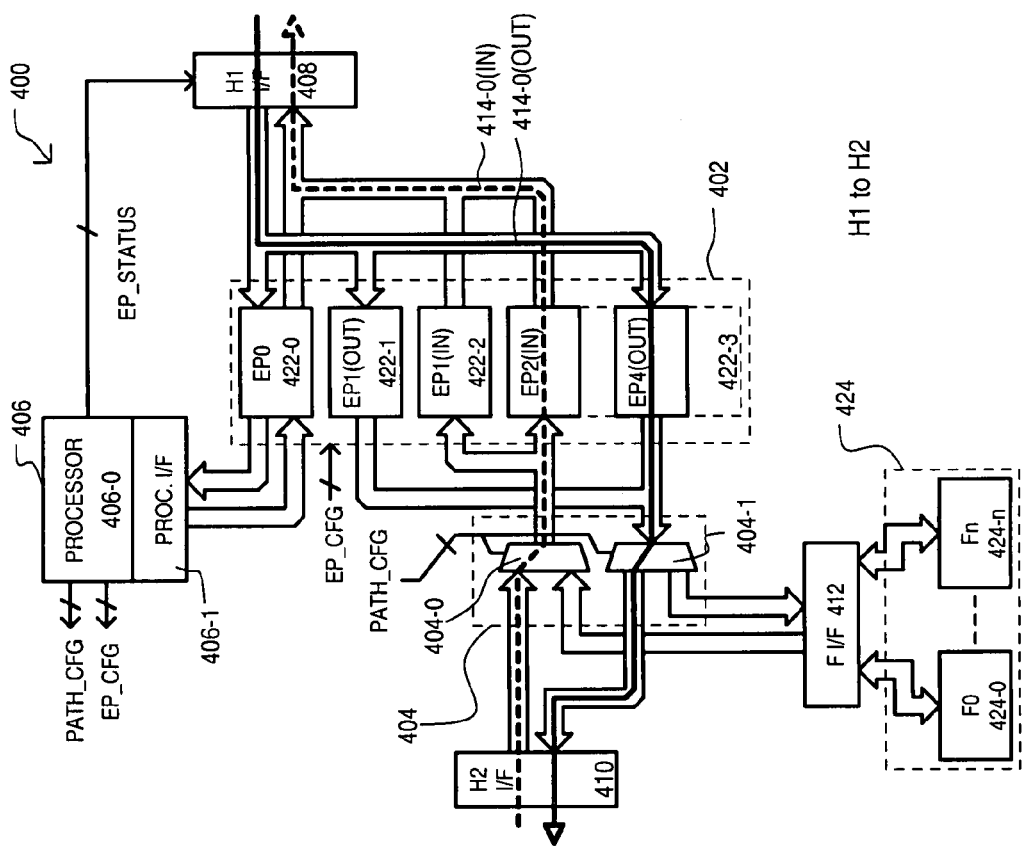
FIGS. 5A to 5F show various configurations for the controller device of FIG. 4.

Referring to FIG. 5A, one example of a H1-H2 communication path is shown for the controller circuit 500 of FIG. 4. In the particular arrangement shown, EP space 422-3 has been configured to include an EP2, configured in the IN direction, and an EP4 configured in an OUT direction. Further, switch/control path 404 has been configured to provide a communication path from second host I/F 410 to EP storage circuit 402, and from EP storage circuit 402 to second host I/F 410. In such a configuration, an OUT direction for H1-H2 can be formed, shown by solid line 414-0 (OUT). OUT path 414-0 can be formed from first host I/F 408, to EP4, through de-MUX path 404-1, to second host I/F 410. In addition, an IN direction for H1-H2 can be formed, shown by dashed line 414-1 (IN). IN path 414-0 can be formed from second host I/F 410, through MUX path 404-0, to EP2, and to first host I/F 410.

In this way, a controller circuit like that of FIG. 4 can provide a H1-H2 path.

Figures 1, 5B:
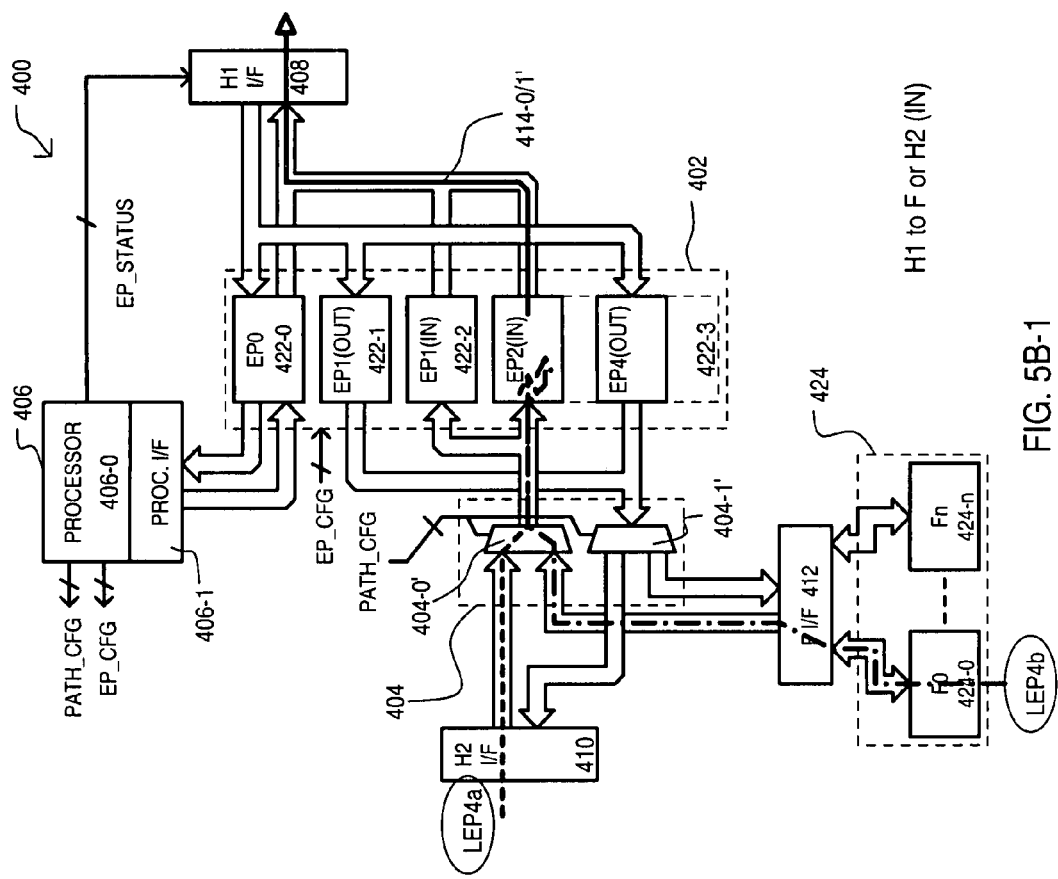
Figures 0, 5B:
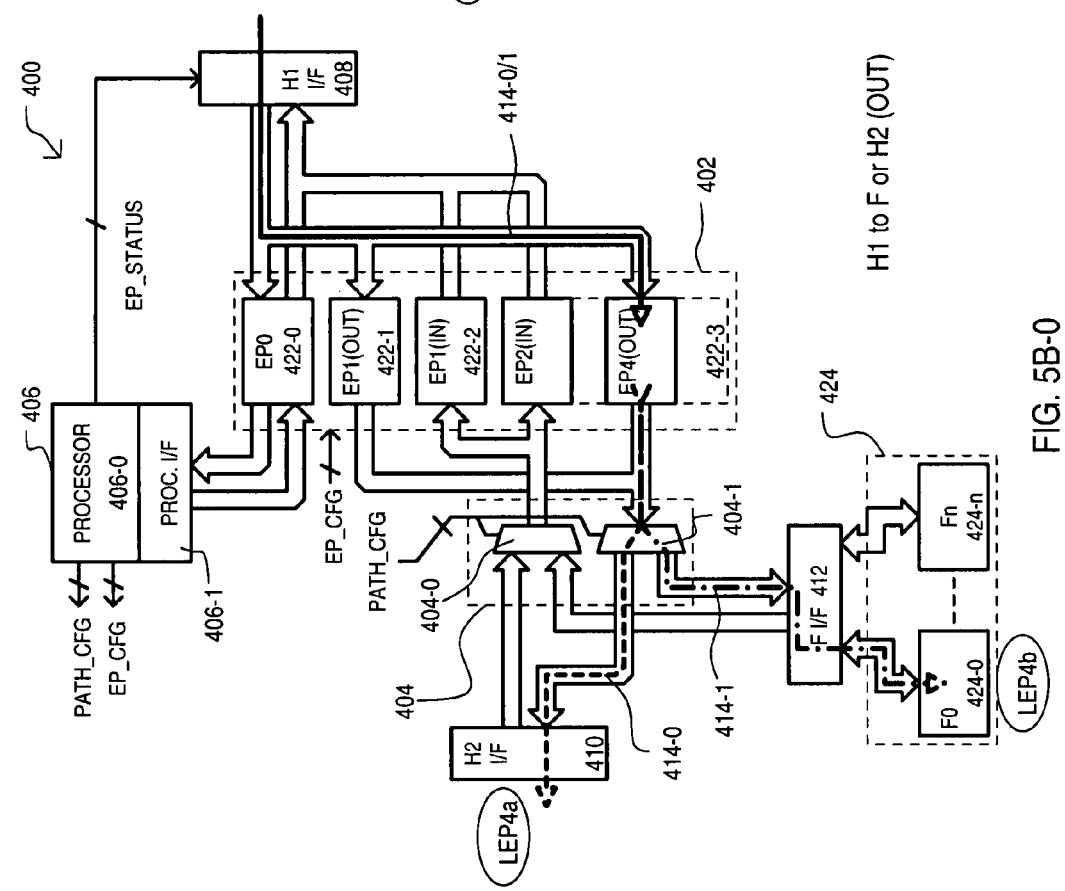

Another feature of the arrangement like of FIG. 4 can be the use of a single physical endpoint to access multiple logical endpoints. One example of such an arrangement is shown in FIGS. 5B-0 and 5B-1. In the particular arrangement shown, EP space 422-3 has been configured to include an EP2 configured in the IN direction, and an EP4 configured in an OUT direction. Switch/control path 404 can be used to direct a data path from a same physical endpoint (e.g., EP4) to different locations, where such different locations form different logical endpoints. In the example shown a first logical endpoint LEP4a can be a second host I/F 410, and a second logical endpoint LEP4b can be function circuit 424-0.

FIGS. 5B-0 shows OUT communication paths that can be created for logical endpoints LEP4a and LEP4b. Both OUT communication paths include a first portion 414-0/1 from first host I/F 408 to EP4. De-MUX path 404-1 can be controlled to provide access to different logical endpoints. Thus, a path 414-0 to logical endpoint LEP4a (shown by a dashed line) can include EP4 and de-MUX 404-1 having a first configuration. A path 414-1 to logical endpoint LEP4b (shown by a dashed and dotted line) can include EP4 and de-MUX 404-1 having a second configuration.

FIG. 5B-1 shows IN communication paths that can be created for logical endpoints LEP4a and LEP4b. MUX path 404-0 can be controlled to provide paths from different logical endpoints. Thus, a path 414-0' from logical endpoint LEP4a can include MUX 404-0 having a first configuration and EP2. A path 414-1' to from logical endpoint LEP4b can include MUX 404-0 having a second configuration and EP2. Both IN communication paths include a path 414-0/1' from EP2 to host I/F 408.

In this way, a controller circuit can provide multiple logical endpoints for a first host I/F utilizing a single physical endpoint.

Figures 0, 1, 5C:
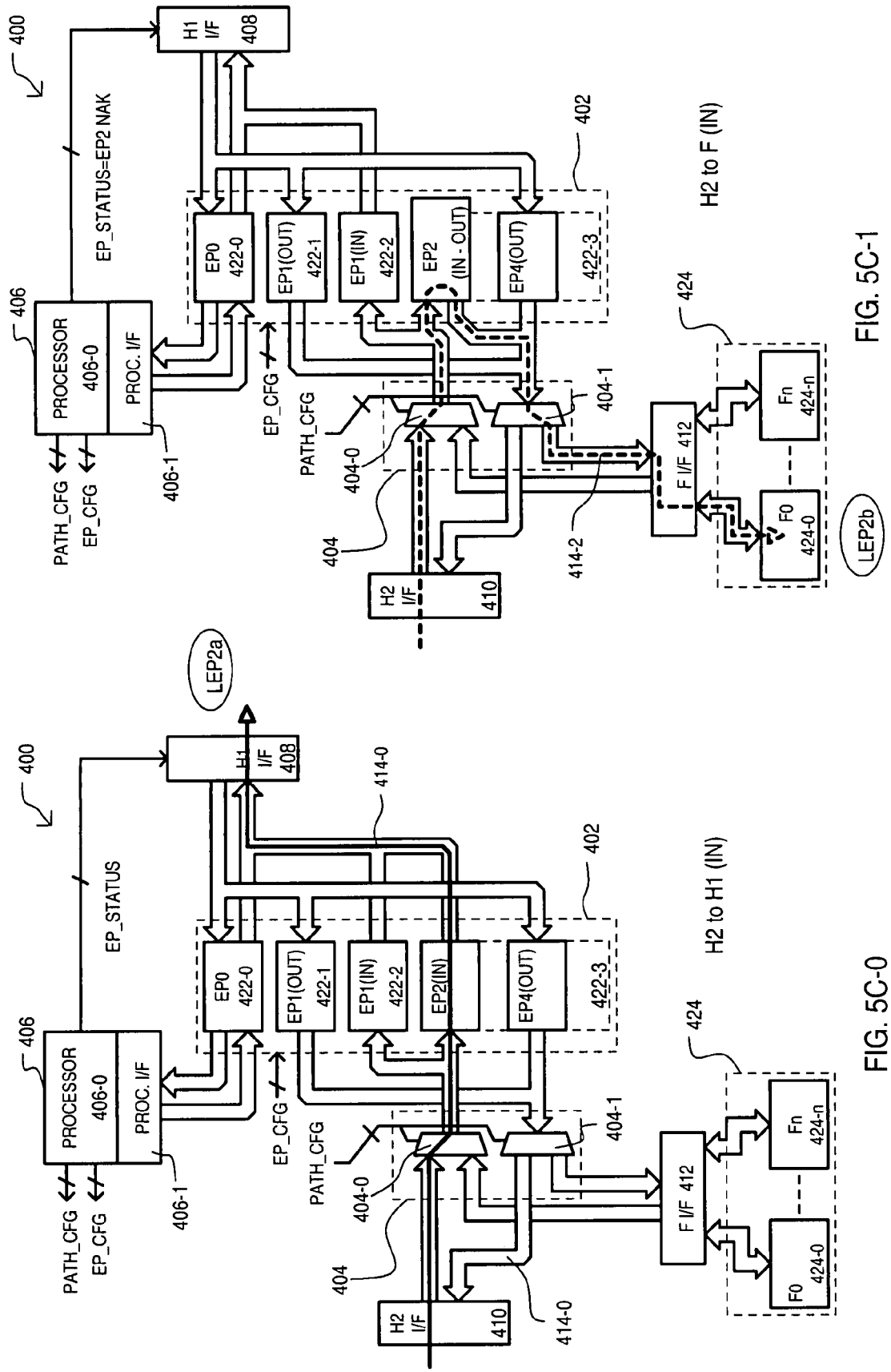

Another example showing the mapping of multiple logical endpoints to a same physical endpoint is shown in FIGS. 5C-0 and 5C-1. In the particular arrangement shown, EP space 422-3 has been configured to include an EP2. A direction of EP2 can be switched to provide different logical endpoints from this one physical endpoint. In the example shown a first logical endpoint LEP2a can be a first host I/F 408, and a second logical endpoint LEP2b can be function circuit 424-0.

FIGS. 5C-0 shows an IN communication path for logical endpoints LEP2a. EP2 can be configured in an IN direction, and MUX path 404-0 can connect second host I/F 410 to EP storage circuit 422-3. A path 414-0 to logical endpoint LEP2a can include MUX 404-0 and EP2 (configured in the IN direction).

FIG. 5C-1 shows an IN communication path with respect to logical endpoint LEP2b. EP2 can be initially be configured in an IN direction, and MUX path 404-0 can connect second host I/F 410 to EP storage circuit 422-3. In such an arrangement data can be written from second host I/F 410 to EP2 through MUX 404-0. Subsequently, a direction of EP2 can be switched from IN to OUT. A communication path can then be created from EP2, through function I/F 412, and on to function circuit 424-0. At the same time, a configuration circuit 406 can provide EP status information that indicates EP2 should not be accessible by first host I/F 408 (shown as "EP2 NAK"). Thus, a path 414-2 to logical endpoint LEP2b can include MUX 404-0, EP2, de-MUX 404-1 and function I/F 412.

While FIGS. 5C-0 and 5C-1 show paths to different logical endpoints from second host I/F 410, the same approach can be used to provide paths from such logical endpoints to second host I/F 410.

In this way, a controller circuit can provide multiple logical endpoints for a second host I/F utilizing a single physical endpoint.

An arrangement like of FIG. 4 can also allow a single host device to access multiple functions. Examples of arrangements are shown in FIGS. 5D and 5E.

Figure 5E:
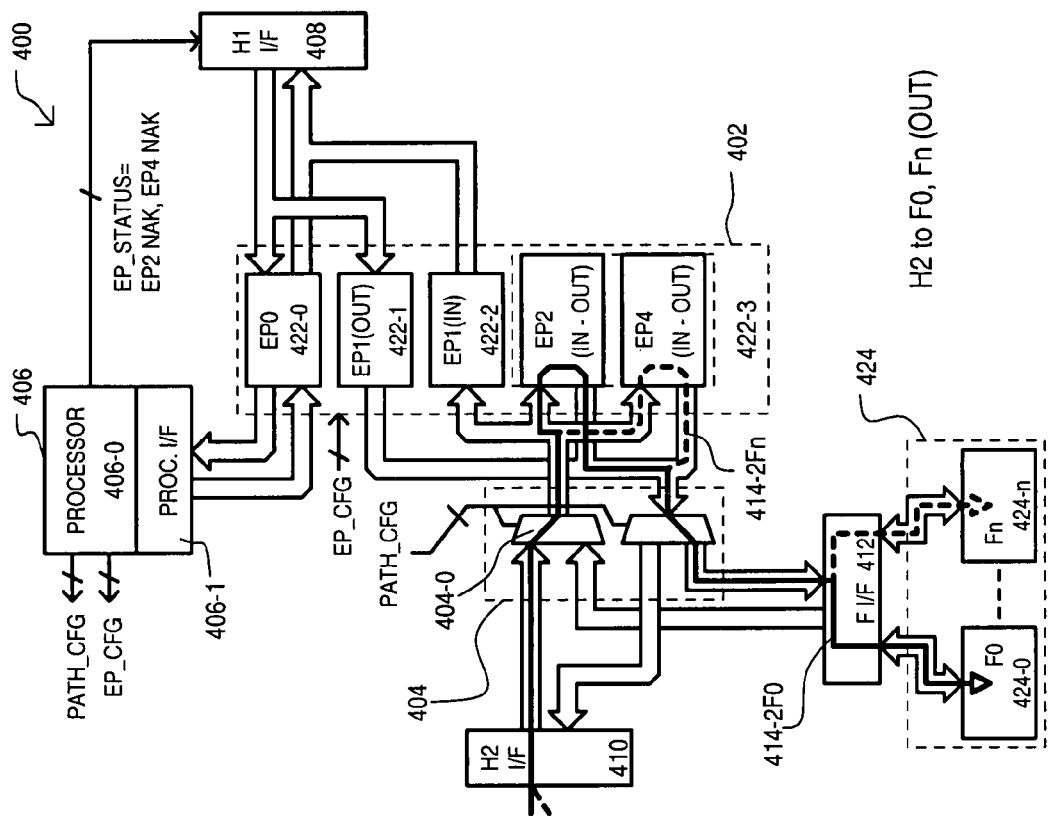
Figure 5D:
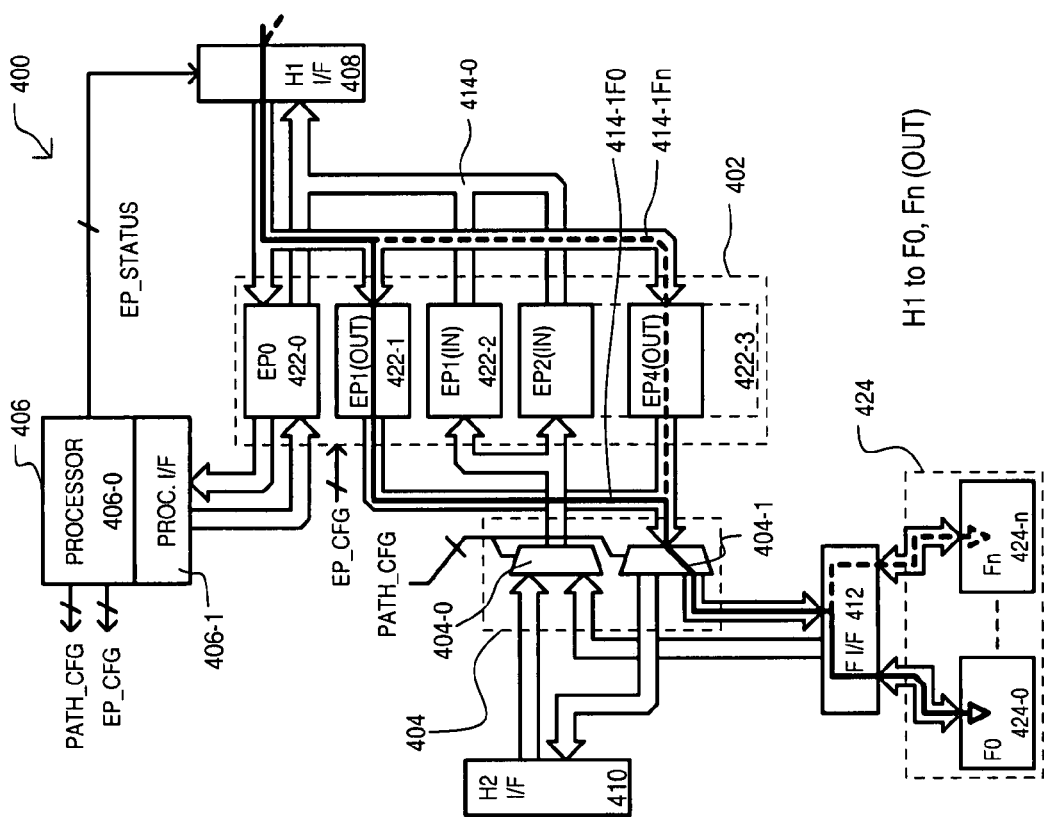

FIG. 5D shows OUT communication paths between different function circuits 424-0 and 424-1 and first host I/F 408. In the example shown, EP4 can be configured in an OUT direction. De-MUX 404-1 can provide a communication path from EP storage circuit 422-3 to function I/F 412. A path 414-1F0 to a first function circuit 424-0 can include EP1 (OUT) 422-1, de-MUX 404-0, and function I/F 412. In a similar fashion, an OUT communication path 414-1Fn to second function circuit 424-n can include EP2, de-MUX 404-0, and function I/F 412.

FIG. 5E shows communication paths between different function circuits 424-0 and 424-1 and second host I/F 410. To access function circuit 424-0, initially EP2 can be configured in an IN direction, and MUX 404-0 can provide a communication path from second host I/F 410 and EP storage circuit 422-3. Subsequently, the direction of EP2 can be changed, and de-MUX 404-1 can provide a communication path from EP storage circuit 422-3 and function I/F 412. To access function circuit 424-n, operations can be essentially the same as that for function circuit 424-0, but include the direction switching of EP4. A communication path to function circuit 424-0 is shown as 414-2F0. A communication path to function circuit 424-n is shown as 414-2Fn.

While FIGS. 5D and 5E show paths having a particular direction, the same communication link in the other direction (to a host) is understood from the other examples above.

In this way, a controller circuit can allow any of multiple host devices (via host I/Fs) to access any of multiple functions.

Figure 5F:
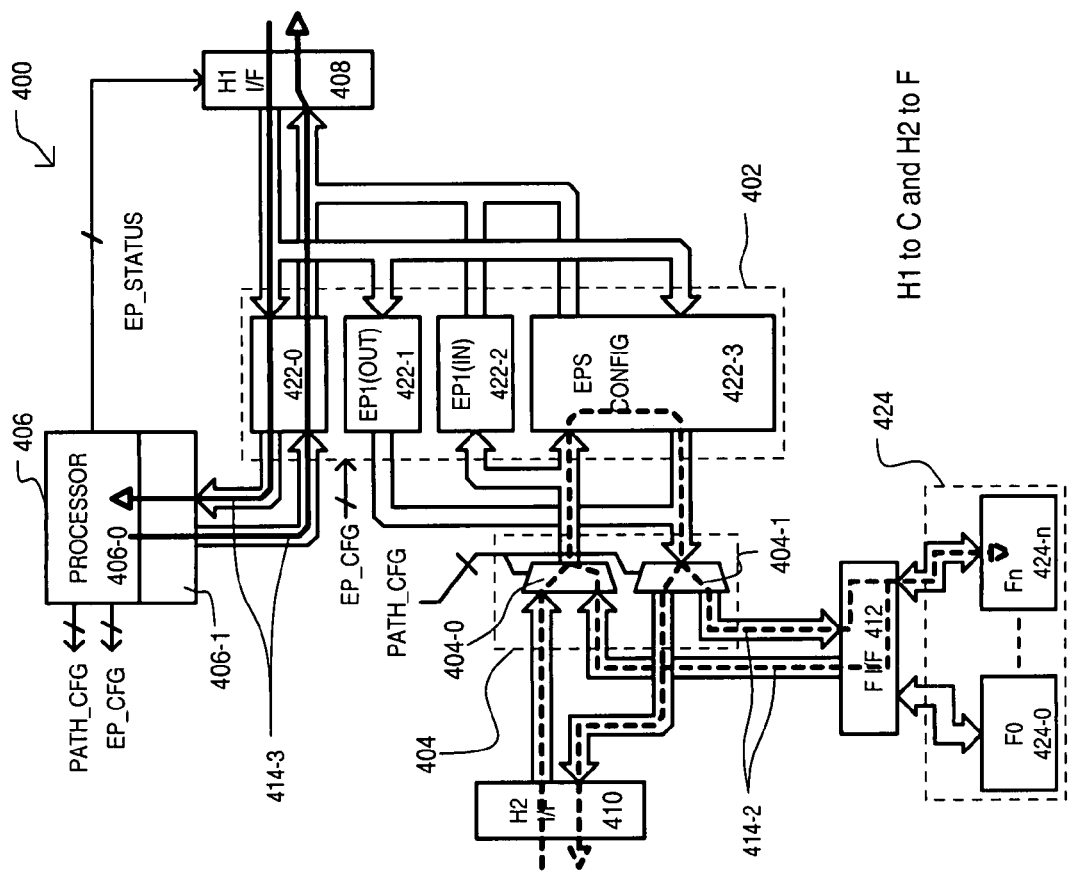

An arrangement like of FIG. 4 can also allow one host device to provide control information to the controller, while, at the same time, a second host accesses functions independently of the first host. FIG. 5F shows one very particular example of such an operation.

As shown in FIG. 5F, a first host-to-control (H1-C) communication path 414-3 can utilize EP0 to provide control information to configuration circuit 406. At the same time, a second host-to-function (H2-F) communication path 414-1 can exists.

In this way, a controller circuit can establish a control communication path to one host while allowing another host to access available functions.

Figure 6:
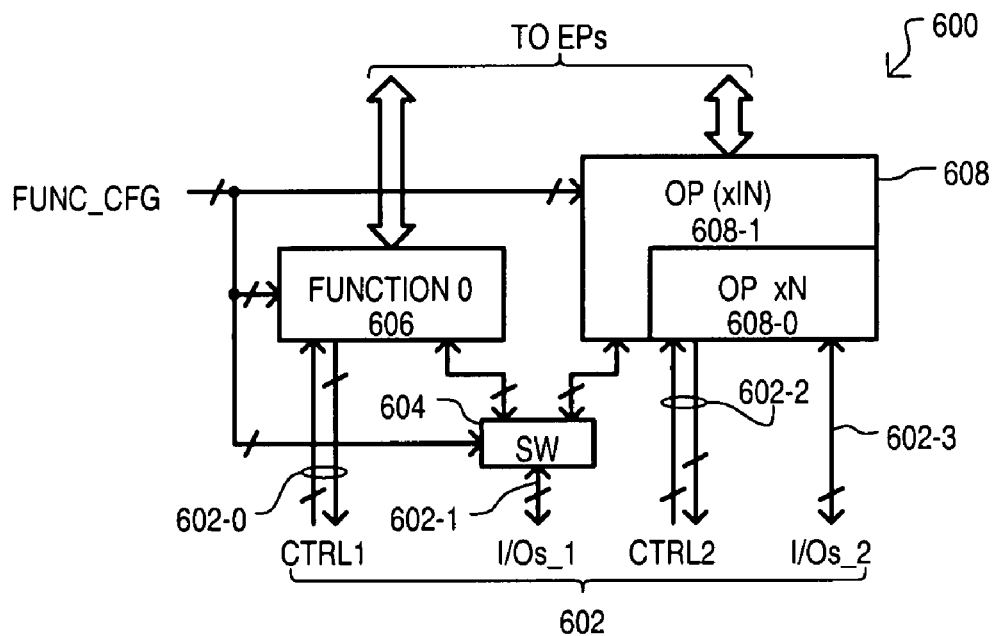
FIG. 6 shows an example of a configurable function interface (I/F) that can be included in the embodiments.

As noted above, embodiments of the present invention can include a configurable function interface. A first particular example of a configurable function interface is shown in FIG. 6, and designated by the general reference character 600.

A configurable function I/F 600 can include a number of physical input/outputs (I/Os) 602, an I/O switch circuit 604, a first function I/F circuit 606, and a second function I/F circuit 608. In the particular example of FIG. 6, physical I/Os 602 can include first control inputs and outputs 602-0, configurable I/Os 602-1, second control inputs and outputs 602-2, and I/Os 602-3. Preferably, physical I/Os can include bond pads of a same integrated circuit device that contains a controller according embodiments shown herein, and equivalents.

An I/O switch circuit 604 can selectively connect configurable I/Os 602-1 to either first function I/F circuit 606 or second function I/F circuit 606 according to configuration information FUNC_CFG.

First function I/F circuit 606 can translate a first type of external signal set into signals compatible with circuits internal to a controller circuit. Similarly, second function I/F circuit 608 can translate a second type of external signal set into signals compatible with circuits internal to controller circuit. As but one example, function I/F circuits (606 and 608) can enable data transfers from endpoint locations to predetermined addresses of devices attached to function I/F 600. The very particular example of FIG. 6 shows a second I/F circuit 606 that can be configured between two different modes of operation. A low I/O count mode 608-0 and a high I/O count mode 608-1. In a high I/O count mode 608-1, second I/F circuit 606 can operate according to both I/Os sets 602-1 and 602-3. In a low I/O count mode 608-0, second I/F circuit 606 can operate according to I/Os set 602-3.

In one very particular example, a first I/F circuit 606 can be a storage port compatible with the SD Memory Card Specification (SD), promulgated by the SD Card Association, the MultiMediaCard System Specification (MMC), promulgated by the MMC Association, and the CE-ATA Standard, promulgated by the CE-ATA Working Group. A second I/F circuit 608 can be a storage port compatible with a NAND memory device, such as those complying with the Open NAND Flash Interface Working Group. More particularly, second I/F circuit 608 can be configurable to operate to operate with one number of I/Os (e.g., ×8) or another number of I/Os (e.g., ×16).

In this way, a configurable function I/F can accommodate one or more different mass storage media devices of differing types.

Figure 7:
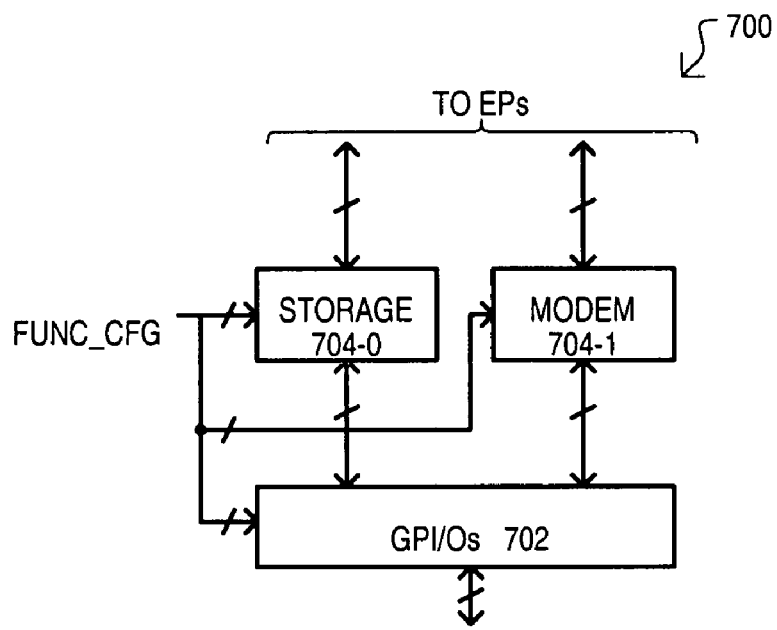
FIG. 7 shows another example of a configurable function I/F that can be included in the embodiments.

A second particular example of a configurable function interface is shown in FIG. 7, and designated by the general reference character 700. The configurable I/F 700 of FIG. 7 can include general purpose I/Os 702 and function I/F circuits 704-0 and 704-1. General purpose I/Os 702 can be configured according to function configuration data FUNC_CFG, to provide inputs and/or outputs to function I/F circuits (704-0 to 704-1). In the particular example shown, function I/F circuits can include a storage I/F 704-0 and a modem I/F 704-1. A storage I/F 704-0 can provide in interface compatible for accessing a memory device. A modem I/F 704-1 can include an interface compatible for transferring data communicated via a modem.

Of course, while FIGS. 6 and 7 show interfaces to particular functions, the present invention should not necessarily be construed as being limited to any particular function interface.

Just as function interfaces can be programmable, in the embodiments described herein, host interfaces can be programmable. An example of such an arrangement is shown in FIG. 8.

A programmable host I/F 800 can include a number of host physical input/outputs (I/Os) 802, a clock circuit 804, data input latches 806-0, address input latches 808, control input latches 810-0, data output buffers 806-1, control output buffers 810-1, and I/O switch circuit 812, a control input map circuit 814, a control output map circuit 816, and a programmable state machine 818.

Figure 8:
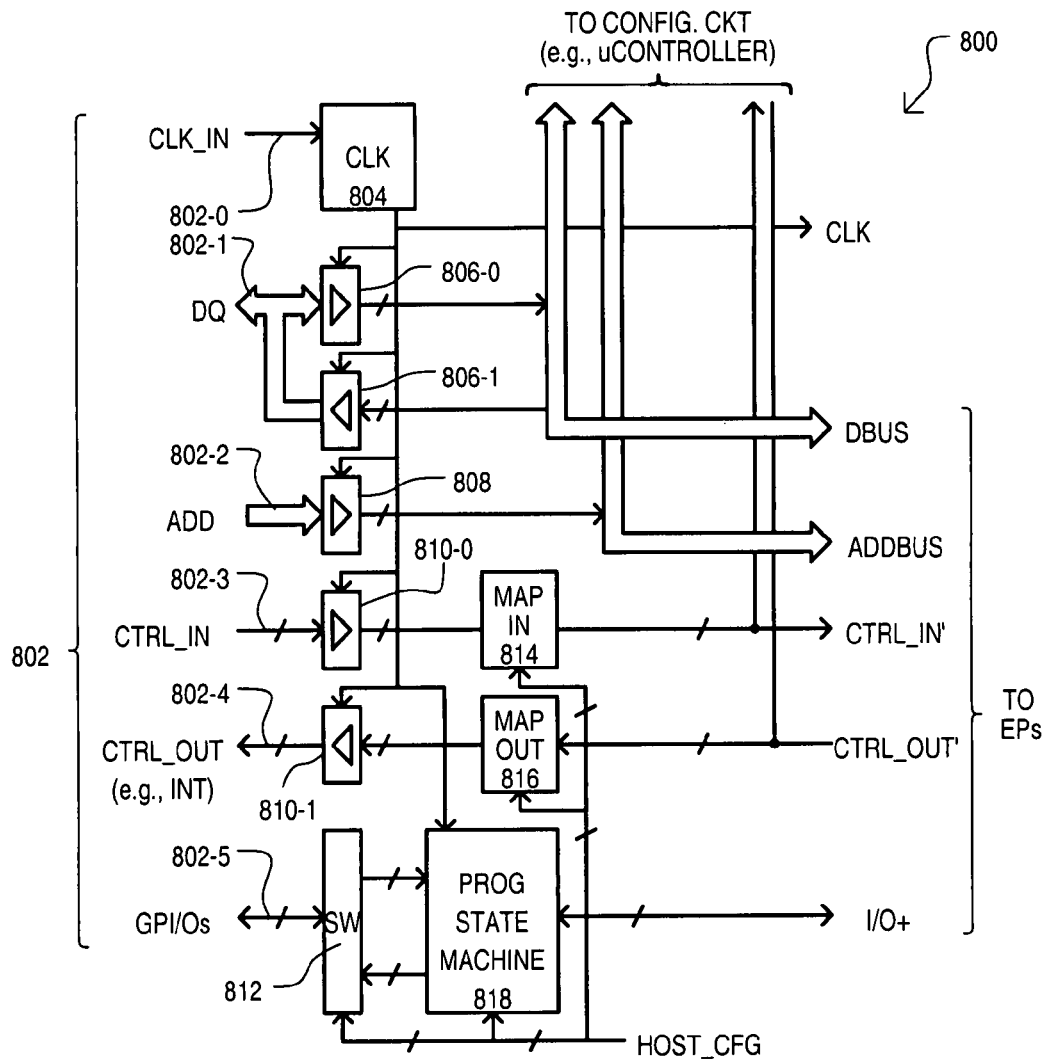
FIG. 8 shows an example of a configurable host I/F that can be included in the embodiments.

In the particular example of FIG. 8, host physical I/Os 802 can include a clock input 802-0, data I/Os 802-1, address inputs 802-2, control inputs 802-3, control outputs 802-4, and general purpose I/Os 802-5. Preferably, host physical I/Os can include bond pads of a same integrated circuit device that contains a controller according embodiments shown herein, and equivalents.

A clock circuit 804 can receive a clock signal CLK_IN, and generate an internal clock signal CLK. In particular arrangements, a clock circuit 804 can be a buffer circuit, or alternatively, can include frequency locking circuits, such as a phase lock loop (PLL) or delay lock loop (DLL).

Data input latches 806-0 can latch data input signals according to clock signal CLK. Similarly, address input latches 808 can latch address values, and control input latches 810-0 can latch control input values according to clock signal CLK.

Data output buffers 806-1 can drive data values on data I/Os 802-1, also in synchronism with clock signal CLK. Control output buffers 810-1 can drive control data on control outputs 802-4 according to clock signal CLK.

I/O switch circuit 812 can selectively enable signal paths from GPI/Os 802-5 to programmable state machine 818, according to host configuration data HOST_CFG.

Control input map circuit 814 can map incoming control signals to particular internal nodes of a controller circuit and/or logically combine such signals to generate internal control signals. In the reverse manner, control output map circuit 816 can map signals at internal nodes of a controller circuit to output control signals and/or logically combine such internal signals to generate output control signals. Such a mapping can be based upon host configuration data HOST_CFG.

A programmable state machine 818 can be programmed to generate a set of output signals in response to predetermined input signals, and set of input signals in response to predetermined output signals. In one particular case, such an arrangement can include "waveform descriptors" which can include both unconditional and conditional steps that are executed according to predetermined signal sets.

In this way, a programmable interface can allow a controller circuit to accommodate various types of host devices.

A controller circuit according the various embodiments can base timing on a generated clock signal. To accommodate various system speeds, it may be desirable to include a clock circuit that can generate or accommodate clock signals of varying frequencies. One particular example of such an arrangement is shown in FIG. 9.

Figure 9:
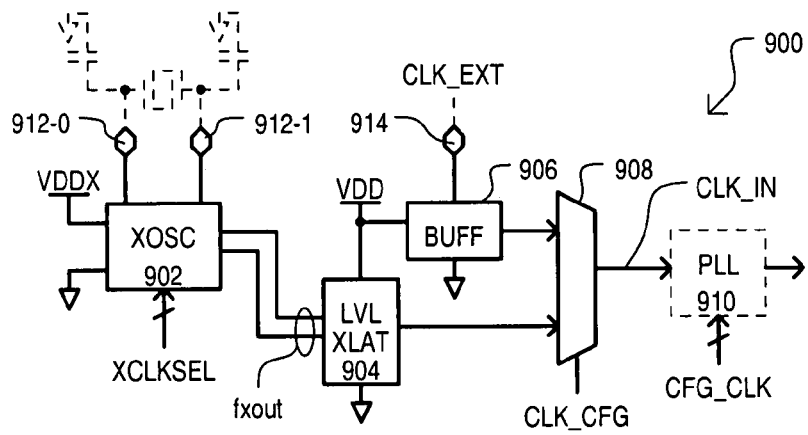
FIG. 9 shows an example of a configurable clock circuit that can be included in the embodiments.

Referring to FIG. 9, a clock circuit is shown in a block schematic diagram and designated by the general reference character 900. A clock circuit 900 can include a crystal oscillator circuit 902, a level translator circuit 904, an external clock buffer 906, and a clock signal selector 908. Optionally, a clock circuit 900 can include a phase lock loop 910.

A crystal oscillator circuit 902 can be connected to a crystal and other passive components by way of a crystal input terminal 912-0 and a crystal output terminal 912-1, which are preferably physical inputs to an integrated circuit (e.g., pins). Crystal oscillator circuit 902 can generate a periodic output signal fxout having a frequency dependent upon an attached crystal. Different oscillating frequencies can be accommodated by selection of different components based on signal XCLKSEL. A crystal oscillator circuit 902 can receive a power supply voltage VDDX, which can be greater than that of other components of a controller circuit.

A level translator circuit 904 can translate and buffer output signal fxout to levels suitable for the other portions of the clock circuit 900.

An external clock buffer 906 can buffer a clock signal received at an external clock input terminal 914. Preferably, such a clock input terminal is a physical input to an integrated circuit.

A clock signal selector 908 can select a clock signal provided from the external clock buffer 906 or crystal oscillator circuit 902 as an input clock signal CLK_IN based on a clock configuration signal CLK_CFG. Optionally, clock input signal CLK_IN can be provided as an input to a phase lock loop circuit 910, which can multiply and/or divide signal CLK_IN to generate a device clock signal CLK_IN'. In the particular arrangement shown, clock division multiplication can occur according to values CFG_CLK.

In this way, a controller circuit can include a clock signal that can operate according to clock signals having a selectable frequency. Further such a clock signal can be generated by an onboard oscillator, or received via a clock input.

Figure 10:
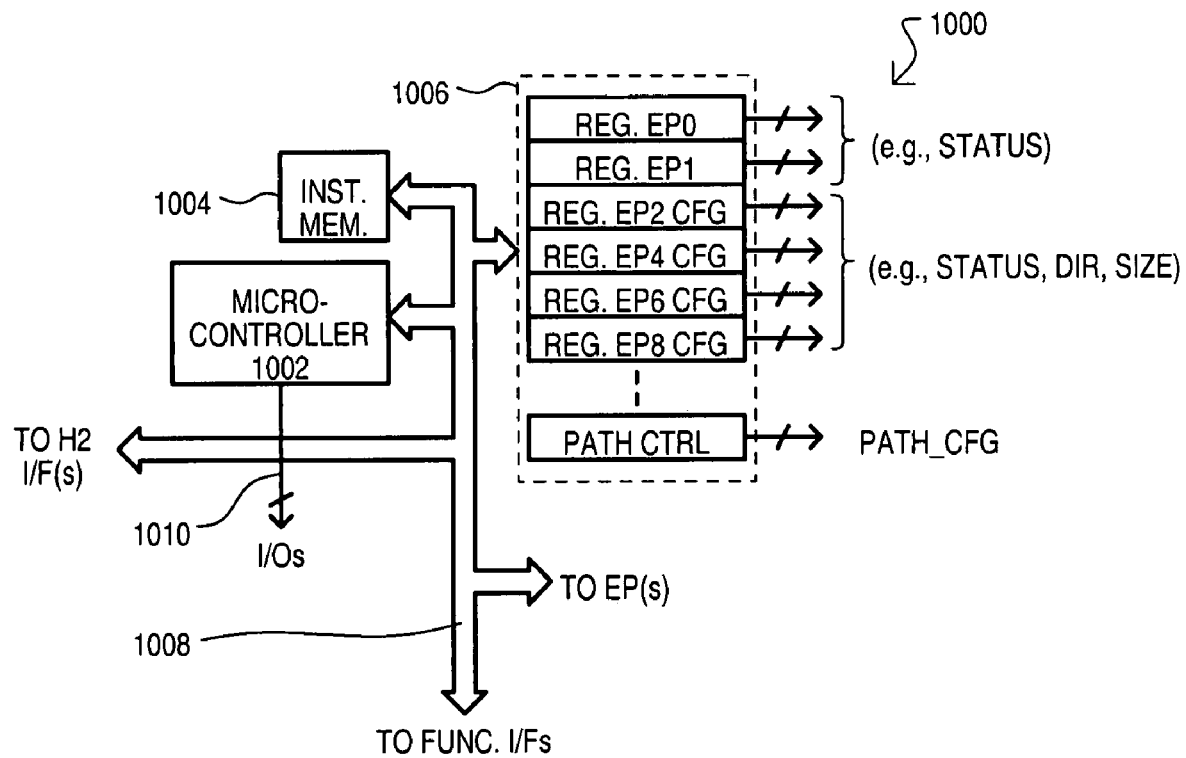
FIG. 10 shows an example of a configuration circuit that can be included in the embodiments.

As shown in various embodiments above, a controller circuit can provide various communication paths by controlling a data path between an endpoint storage circuit and either a second host I/F or a function I/F. Additional communication paths can be formed by dynamically switching directions of endpoints. As previously noted, it may be advantageous to provide changes in the configuration of such paths in a dynamic fashion. One example of a configuration circuit for providing such dynamic control is shown in FIG. 10, and designated by the general reference character 1000.

A configuration circuit 1000 can include a processor 1002, an instruction memory 1004, control registers 1006, and an address/data bus 1008. In very particular examples, a configuration circuit 1000 can correspond to any of configuration circuits shown as 206, 306 or 406 in other embodiments above.

A processor 1002 can execute instructions stored in an instruction memory 1004 and can provide input/output signals on configuration I/O lines 1010. In the very particular example of FIG. 10, a processor 1002 can include a microcontroller. An instruction memory 1004 can store instructions for execution by processor 1002.

It is noted that instruction memory 1004 can be connected to address/data bus 1008, and address bus 1008 can be connected to a second host I/F, EPs, and/or a function I/F. Such an arrangement can allow instructions to be stored in instruction memory 1004 by either a first host (e.g., via an EP), a second host, or a function. Instructions stored within instruction memory 1004 can be firmware or software. This configuration can allow such firmware or software to be loaded via a first host I/F, second host I/F, or even a function I/F.

In the particular example of FIG. 10, configuration of EPs and/or communication paths (e.g., MUXing and de-MUXing from EPs) can be established by values stored in control registers 1006. Thus, a processor 1002 can write values to control registers to thereby configure EPs and/or data paths. Optionally, such control registers can be accessible by way address/data bus 1008. Such an arrangement can enable a controller circuit to be configured by either host I/F, or by way of function I/F.

Alternatively, a processor 1002 can provide configuration data by way of I/O lines, rather than control registers.

In this way, a control circuit can configure a controller circuit according to sequences contained within firmware or software.

In controller circuit configurations like that of FIG. 4, the formation of direct communication paths between host devices and common functions can include sharing endpoints. In such an arrangement, it may be desirable to ensure that one host is prevented from accessing an endpoint while another host or function is using the endpoint. Circuits for such an arrangement are shown in FIG. 11.

Figure 11:
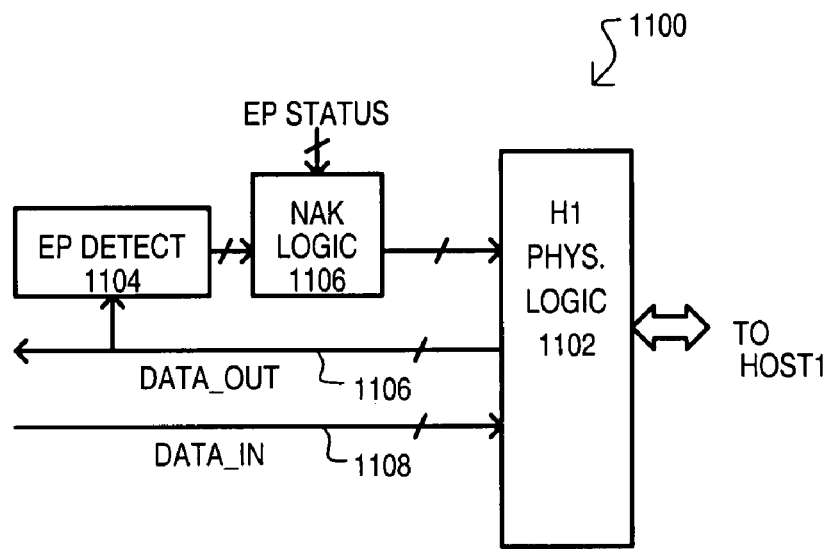
FIG. 11 shows an example of a host interface circuit that can be included in the embodiments.

FIG. 11 shows a host input circuit according to one embodiment. Host input circuit 1100 can include a physical layer logic circuit 1102, an endpoint detect circuit 1104, and an acknowledgement circuit 1106. A physical layer logic circuit 1102 can receive data from a first host, and place such data on a DATA_OUT bus 1106. Similarly, data from a controller circuit can be received on a DATA_IN bus 1108. In one very particular example, a host input circuit 1100 can be a USB physical layer circuit that can receive an incoming serial data stream in packets, and format such data for storage at endpoint locations. Such a circuit can also format outgoing data into packets, and output such data in a serial data stream.

An endpoint detect circuit 1104 can examine outgoing data from a host for a destination endpoint. Such an endpoint value can be provided to acknowledgement circuit 1106. Acknowledgement circuit 1106 can receive endpoint status information EP_STATUS and a destination endpoint value from endpoint detect circuit 1104. If acknowledgement circuit 1106 determines that a destination endpoint matches an endpoint currently in use by another host or function, it can output a "no acknowledge" indication (NAK) to physical layer logic circuit 1102. In response, physical layer logic circuit 1100 can issue a no acknowledgement back to the host.

In this way, a controller circuit can handle accesses from one host while an endpoint is in use by another host or function.

Embodiments of the present invention can be well suited to performing various other steps or variations of the steps recited herein, and in a sequence other than that depicted and/or described herein.

For purposes of clarity, many of the details of the various embodiments and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A controller circuit comprising:
an endpoint buffer circuit having a plurality of storage locations configurable as endpoints according to a USB protocol; and
a data switching circuit coupled to the endpoint buffer circuit configurable to provide communication paths that enable a first host interface (I/F) and a second host I/F to access at least an individual function I/F of one or more function I/Fs of the controller circuit configured to allow access to at least one predetermined circuit function, and to enable first and second host I/F's to communicate with one another, wherein the communication paths include a first communication path that enables the first host I/F to access at least the individual function I/F without passing through the second host I/F and a second communication path that enables the second host I/F to access at least the individual function I/F without passing through the first host I/F, and wherein the data switching circuit comprises a multiplexer (MUX) and a de-multiplexer (DE-MUX) coupled to the endpoint buffer circuit, the second host I/F and the at least one individual function I/F to selectively provide the communication paths.

2. The controller circuit of claim 1, wherein:
the individual function I/F is coupled to any selected from the group consisting of a storage device or input/output device.

3. The controller circuit of claim 1, wherein:
the data switching circuit can include any selected from the group consisting of a shared data bus or the multiplexer selectively accessible by at least the second host I/F and the individual function I/F.

4. The controller circuit of claim 1, wherein:
the controller circuit is configurable to provide a first host-to-second host transmission path that includes portions of the data switching circuit and portions of the endpoint buffer circuit.

5. The controller circuit of claim 1, wherein:
the controller circuit is configurable to provide a third communication path between the individual function I/F and both the first host I/F and the second host I/F that includes portions of the data switching circuit and portions of the endpoint buffer circuit.

6. The controller circuit of claim 1, wherein:
the at least one function I/F comprises a plurality of function I/Fs that are each configurable to provide one or more signals for accessing at least one different predetermined function, the controller circuit being configurable to provide an individual first host I/F communication path between the first host I/F and at least two of the plurality of function I/Fs.

7. The controller circuit of claim 1, wherein:
the at least one function I/F comprises a plurality of function I/Fs that are each configurable to provide one or more signals for accessing at least one different predetermined function, the controller being configurable to provide an individual second host I/F communication path between the second host I/F and at least two of the plurality of function I/Fs.

8. The controller circuit of claim 1, wherein:
the endpoint buffer circuit is configurable to have at least one physical endpoint corresponding to an endpoint identification value of the USB protocol; and
the data switching circuit is configurable to provide at least two different communication paths from the one physical endpoint as different logical endpoints corresponding to the one physical endpoint.

9. The controller circuit of claim 1, wherein:
the individual function I/F is programmable between at least two different function I/Fs, each different function I/F enabling access to at least one other predetermined circuit function.

10. The controller circuit of claim 9, wherein:
the at least two different functions include accesses to different types of solid state storage media.

11. The controller circuit of claim 1, wherein:
the second host I/F is programmable between at least two different configured host I/Fs, each different configured host I/F enabling communication with a different type of host.

12. The controller circuit of claim 1, further including:
a processor coupled to a memory and configurable to execute instructions stored in the memory and outputs configuration data; and
wherein the data switching circuit is configurable according to the configuration data.

13. The controller circuit of claim 1, wherein the first host I/F comprises:
an endpoint detector configurable to determine an endpoint value of a communication received at the first host I/F, and
a response circuit coupled to the endpoint detector and configurable to receive endpoint status information, the response circuit providing a predetermined indication when the endpoint value corresponds to an endpoint indicated as in use by at least one function I/F of the one or more function I/Fs or the second host I/F by the endpoint status information.

14. The controller circuit of claim 1, wherein:

the data switching circuit is configurable to provide a control communication path between the first host I/F and a control endpoint, and at the same time, the second communication path.

15. The controller circuit of claim 1, further including:

a processor circuit configurable to execute instructions stored in a processor memory and outputs configuration data, the processor memory being coupled to any selected from the group of: the first host I/F, the second host I/F, or at least one of the one or more function I/Fs; and wherein the data switching circuit is configurable according to the configuration data.

16. The controller circuit of claim 1, further including:

a timing circuit for generating a timing signal for the controller circuit, the timing circuit comprising at least one crystal input operable for receiving a crystal; and an oscillator circuit for generating an oscillating signal according to a crystal at the at least one crystal input, the oscillator circuit configured to accommodate any of a plurality of crystals of different resonance frequencies.

17. A method comprising the steps of:

in one integrated circuit, providing at least a first data communication path between a first host interface (I/F) and at least a first endpoint storage location;

providing a second data communication path between the first host I/F and a second endpoint storage location;

configuring the second communication data path between the second endpoint storage location and a controller; and configuring a third data communication path between at least the first endpoint storage location and a second host I/F and between at least the first endpoint storage location and a function I/F, wherein the second host I/F is programmable to accommodate different interface types, and wherein the function I/F is programmable to provide access to one or both of: different types of functions or different versions of an individual function, and wherein the second data communication path and the third data communication path can be utilized simultaneously.

18. The method of claim 17, further including:

in a communication between the first host I/F and the second host I/F or a transfer between the first host I/F and the function I/F, storing data in at least one endpoint storage location configured for the direction of communication.

19. The method of claim 18, wherein:

in a communication between the second host I/F and the function I/F, storing data in at least one endpoint storage location configured for in a first direction, and switching the direction of the endpoint storage location.

20. The method of claim 17, wherein:

configuring the data communication path includes creating predetermined signal paths according to configuration information output from a processor that executes instructions in an instruction memory; and in a configuration operation, loading instruction data into the instruction memory from one or more of: the first host I/F, the second host I/F, or the at least one function I/F.

21. A controller circuit device, comprising:

an integrated circuit substrate that includes a first host interface (I/F) operable to communicate with a first type host device, a second host I/F operable to communicate with a second type host device, and at least one function I/F operable to communicate with at least one predetermined function; and a control and memory circuit configurable to provide a plurality of communication paths, including at least a first host I/F to second host I/F path that includes a portion of an endpoint buffer memory but does not include the at least one function I/F, a first host I/F to function I/F path that includes a portion of the endpoint buffer memory but does not include the second host I/F, and a second host I/F to function I/F path that includes a portion of the endpoint buffer memory but does not include the first host I/F, and further comprising a multiplexer (MUX) and a de-multiplexer (DE-MUX) coupled to the endpoint buffer memory, the second host I/F and the at least one function I/F to selectively provide at least some of the plurality of communication paths.

22. The controller circuit device of claim 21, wherein:

the first host I/F is a universal serial bus (USB) I/F.

* * * * *